US008262449B2

(12) United States Patent
Yoshizawa

(10) Patent No.: US 8,262,449 B2
(45) **Date of Patent: *Sep. 11, 2012**

(54) PLAYING METHOD OF CARD GAME AND GAME MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 503 days.

This patent is subject to a terminal disclaimer.

(21) Appl. No.: 12/402,063

(22) Filed: Mar. 11, 2009

(65) Prior Publication Data

US 2009/0233673 A1 Sep. 17, 2009

Related U.S. Application Data

(60) Provisional application No. 61/035,552, filed on Mar. 11, 2008.

(51) Int. Cl.
*A63F 9/24* (2006.01)
*A63F 13/00* (2006.01)

(52) U.S. Cl. ........................................... 463/13; 463/30

(58) Field of Classification Search .................... 463/13, 463/30
See application file for complete search history.

(56) References Cited

U.S. PATENT DOCUMENTS 5,711,525 A 1/1998 Breeding
6,749,200 B2 * 6/2004 Yurkins ......................... 273/292
6,789,801 B2 9/2004 Snow
6,793,220 B1 * 9/2004 Feola ............................ 273/292
6,874,786 B2 4/2005 Bruno et al.
2005/0176487 A2 * 8/2005 Cimring et al. ................. 463/13
2007/0004512 A1 1/2007 Toyoda

* cited by examiner

*Primary Examiner* — Xuan Thai
*Assistant Examiner* — Michael Grant
(74) *Attorney, Agent, or Firm* — KMF Patent Services, PLLC; Kenneth M. Fagin, Esq.

(57) ABSTRACT

A card game playing method, for performing a basic game and a side game, is provided, and includes the steps of: (a) dealing player's cards to a player having accepted participation entry, and dealing banker's cards to a banker, from a first card set consisting of plural kinds of cards, while in the basic game; (b) determining player's cards dealt to a player having accepted in excess of the number of players, based upon cards excluding the banker's cards dealt based upon the first card set, among the first card set and a second card set consisting of cards included in the first card set, in a case where the number of players having accepted the participation exceeds a predetermined number of players; (c) dealing the player's cards dealt in the step (b) to a player having accepted participation, while in the basic game; (d) determining a winner or loser, and paying out a payment, by comparing the players' cards with the banker's cards, while in the basic game; and (e) comparing all the players' cards in the basic game with the banker's cards, and paying out a payment of a jackpot to a player having a winning combination with a high payment among plural kinds of winning combinations, while in the side game.

12 Claims, 17 Drawing Sheets

FIG.14

| HIGH HANDS | PAYOUT TYPES |
|---|---|
| ONE PAIR | MINI |
| TWO PAIRS | |
| THREE OF A KIND | |
| STRAIGHT | MAJOR |
| FLUSH | |
| FULL HOUSE | |
| FOUR OF A KIND | MEGA |
| STRAIGHT FLUSH | |
| ROYAL FLUSH | |

PLAYING METHOD OF CARD GAME AND GAME MACHINE

CROSS-REFERENCE TO RELATED APPLICATIONS

This application claims priority of U.S. Provisional Application No. 61/035,552 filed on Mar. 11, 2008. The contents of this application are incorporated herein by reference in their entirety.

BACKGROUND OF THE INVENTION

1. Field of the Invention

The present invention relates to a method of playing card games and a game machine.

2. Description of the Related Art

Conventionally, table games such as poker or blackjack and baccarat are widely known which are performed by a plurality of players in gaming performs such as Casinos. In recent years, a plenty of players have often enjoyed a variety of pokers such as a PAIGOW poker or a Caribbean Stud poker.

With the prevalence of gaming places and game arcades in recent years, game machines have been introduced which allow computers to take over a dealer in such games employing cards, such that players can casually enjoy the games as described above. In this game machine, the dealing of cards and the determination of what numbers or symbols of the dealt cards might be are executed by gaming machines executing programs. The players recognize what cards have been dealt by way of images of the cards displayed on the display devices such as liquid crystal displays, and perform game operation with the use of input devices. Such game machines are disclosed in US Published Patent Application No. 20070004512.

In addition, a game machine exists which is capable of accepting a side BET different from a normal BET. For example, in blackjack, in a case where one of the dealer's two cards, for example, a card "Ace" is faced up, the players can perform a side BET called "Insurance" in addition to a normal BET. In a case where "Insurance" is performed, the players can additionally make a first bet at half price. In a case where the dealer's hand is "Natural 21", the amount of bet, which is twice of the side BET (insurance), is paid back.

In the Caribbean Stud poker, for example, a side BET is accumulatively stored as a progressive jackpot. The players can acquire all or part of the progressive jackpots in accordance with an established hand when performing a side BET in addition to an ante (a normal BET). Games for accepting the side BET are disclosed in U.S. Pat. Nos. 6,789,801, 5,711,525, and 6,874,786, for example.

Further, a game machine also exists which is capable of performing a PAIGOW poker. The rules of the PAIGOW poker are different from those of other pokers. First, seven cards are dealt to each of a plurality of persons consisting of a banker and players, and each of them divides the seven cards into a group of five cards and a group of two cards. The hands of five cards are compared with each other among the banker and the players. Similarly, the hands of two cards are compared with each other. The winner or loser of the game is determined only when at least one of the players has won in both of the above hands. The procedures for dividing the dealt cards into two groups exist, whereby the players are required to adopt a strategy different from those of other pokers, which becomes a kind of amusing attractiveness of the game.

However, in these card game and game machine, in general, if gaming is performed in one group of cards (52 cards may include a joker), only a predetermined small number of players could be participate. In the PAIGOW poker, for example, seven cards are dealt to each person, and up to only seven persons including the dealer and the players could participate. Because of the limited space of the gaming places, further, not so many input devices could be installed corresponding to gaming tables. In view of this fact also, only a limited number of players can participate in the games performed on gaming tables. Therefore, a need exists for the advent of new methods of playing card games and game machines without any limitation to the number of participants in games.

The present invention has been made in view of the above-described problems. It is an object of the present invention to provide a method of playing card games and a game machine, having new entertainability, in which players can participate without a waiting time and which a large number of persons can use.

SUMMARY OF THE INVENTION

A first aspect of the present invention is a game machine, including: a plurality of display devices provided corresponding to respective ones of a plurality of players; a plurality of input devices provided corresponding to respective ones of a plurality of players, for accepting entry for participation of the players; a memory for storing first card set data inclusive of plural types of card data and second card set data inclusive of card data identical to those included in the first card set data; a controller for controlling the display device, the input device, and the memory, the controller being programmed to: (a) perform a basic game; (b) display player's cards on a display device corresponding to a player having accepted participation entry from the input device, based upon the first card set data, and display banker's cards on a banker's display device, respectively, while in the basic game; (c) display player's cards on a display device corresponding to a player having accepted participation entry in excess of the number of players, based upon card data excluding the banker's cards from card data included in the second card set data, in a case where participation entry of players of which number is equal to or greater than a predetermined number of players is accepted, while in the basic game; (d) determine a winner or loser, and pay out a payment, by comparing the players' cards with the banker's cards, while in the basic game; (e) perform a side game in a case where a processing condition is met while in the basic game; and (f) compare the player's cards with the banker's cards in the basic game, and pay out a payment of a jackpot to a player having a winning combination with a high payment among plural kinds of winning combinations, while in the side game.

According to the first aspect of present invention, it is possible to solve the outstanding problem described below. In the related art, for example, where a predetermined number of players already participated in a game, neither other player could participate therein until a vacancy takes place nor participants of which number exceeds the predetermined number could be increased. On the other hand, according to the first aspect of the invention, a dealer can use a plurality of card sets, so that another player can participate in the game partway without waiting a minute. In addition, the number of participants can be increased, thus allowing a large number of players to perform the game, followed by producing a thriving atmosphere. Further, a plenty of players compete against one banker, thus producing the sense of solidarity among the players. Furthermore, as one or more of the players win against the banker, and then, more and more players participate in the game, they can anticipate a possibility that a higher jackpot payment is paid out. Thus, a player having a winning combination with a high payment further enhances the sense of anticipation. Therefore, a card game machine with these novel entertainabilities can be provided.

A second aspect of the present invention is the game machine of the first aspect, wherein: the controller is operable to pay out a payment corresponding to a predetermined combination other than that of the jackpot, in a case where the player's cards include the predetermined combination, in the process (f).

According to the second aspect of the present invention, for example, a payment according to the card combination other than that of a jackpot is further paid out to a player who has successfully acquired the jackpot by cards including a predetermined card combination, thus allowing the player to enhance the sense of anticipation to a higher payment. Further, for a player who has not successfully acquired a jackpot as well, even if the plural kinds of winning card combinations are realized, the payments according to the winning card combinations are paid out, thus allowing the player to increase an interest for realization of the winning card combinations, and then, enhance the sense of anticipation. Therefore, a card game machine with these novel entertainabilities can be provided.

A third aspect of the present invention is the game machine of the first or second aspect, further including: an input device for accepting a side BET which is different from a normal BET; and a memory for accumulatively storing a progressive value corresponding to the side BET accepted by the input device, wherein: the controller is operable to pay out a payment corresponding to the jackpot or the combination, in a case where a side BET is accepted by the input device from the player receiving the payment corresponding to the jackpot or the combination, in the process (f).

According to the third aspect of the present invention, a progressive value accumulatively increases in response to a side BET which is different from a normal BET. As more and more players participate in games, the progressive value accumulatively increases earlier, thus allowing the players to anticipate a higher payment, and then, enhance the sense of anticipation. Therefore, a card game machine with novel entertainabilities can be provided.

A fourth aspect of the present invention is a game machine, including: a plurality of display devices provided corresponding to respective ones of a plurality of players; a plurality of input devices provided corresponding to respective ones of a plurality of players, for accepting entry for participation of the players; a memory for storing first card set data inclusive of plural types of card data and second card set data inclusive of card data identical to those included in the first card set data; a controller for controlling the display device, the input device, and the memory, the controller being programmed to: (a) perform a basic game; (b) display player's cards on a display device corresponding to a player having accepted participation entry from the input device, based upon the first card set data, and display banker's cards on a banker's display device, respectively, while in the basic game; (c) display player's cards on a display device corresponding to a player having accepted participation entry in excess of the number of players, based upon card data excluding the banker's cards from card data included in the second card set data, in a case where participation entry of players of which number is equal to or greater than a predetermined number of players is accepted, while in the basic game; (d) determine a winner or loser, and pay out a payment, by comparing the players' cards with the banker's cards, while in the basic game; (e) perform a side game in a case where a processing condition is met while in the basic game; and (f) compare the players' cards with the banker's cards in the basic game, pay out a payment of a jackpot to a player having a winning combination with a high payment among plural kinds of combinations, and pay out a payment corresponding to a predetermined combination other than that of the jackpot, in a case where the players' cards include the predetermined combination, while in the side game.

A fifth aspect of the present invention is the game machine of the fourth aspect, further including: an input device for accepting a side BET which is different from a normal BET; and a memory for accumulatively storing a progressive value corresponding to the side BET accepted by the input device, wherein: the controller is operable to pay out a payment corresponding to the jackpot or the combination, in a case where a side BET is accepted by the input device from the player receiving a payment corresponding to the jackpot or the combination, in the process (f).

A sixth aspect of the present invention is a game machine, including: a plurality of display devices provided corresponding to respective ones of a plurality of players; a plurality of input devices provided corresponding to respective ones of a plurality of players, for accepting entry for participation of the players and side BET; a memory for storing first card set data inclusive of plural types of card data, second card set data inclusive of card data identical to those included in the first card set data, and a progressive value corresponding to the side BET accepted by the input device; a controller for controlling the display device, the input device, and the memory, the controller being programmed to: (a) perform a basic game; (b) display player's cards on a display device corresponding to a player having accepted participation entry from the input device, based upon the first card set data, and display banker's cards on a banker's display device, respectively, while in the basic game; (c) display player's cards on a display device corresponding to a player having accepted participation entry in excess of the number of players, based upon card data excluding the banker's cards from card data included in the second card set data, in a case where participation entry of players of which number is equal to or greater than a predetermined number of players is accepted, while in the basic game; (d) determine a winner or loser, and pay out a payment, by comparing the players' cards with the banker's cards, while in the basic game; (e) perform a side game in a case where a processing condition is met while in the basic game; and (f) compare the players' cards with the banker's cards in the basic game, pay out a payment having a winning combination with a high payment among plural kinds of combinations and accepting a side BET, and pay out a payment corresponding to a predetermined combination other than that of the jackpot to a player accepting a side BET, in a case where the players' cards include the predetermined combination, while in the side game.

A seventh aspect of the present invention is a card game playing method, for performing a basic game and a side game, the method including the steps of: (a) dealing player's cards to a player having accepted participation entry, and dealing banker's cards to a banker, from a first card set consisting of plural kinds of cards, while in the basic game; (b) determining player's cards dealt to a player having accepted in excess of the number of players, based upon cards excluding the banker's cards dealt based upon the first card set, among a second card set consisting of cards included in the first card set, in a case where the number of players having accepted the participation exceeds a predetermined number of players; (c) dealing the player's cards determined in the step (b) to a player having accepted participation, while in the basic game; (d) determining a winner or loser, and paying out a payment, by comparing the players' cards with the banker's cards, while in the basic game; and (e) comparing all the players' cards with the banker's cards in the basic game, and paying out a payment of a jackpot to a player having a winning combination with a high payment among plural kinds of winning combinations, while in the side game.

An eighth aspect of the present invention is the card game playing method of the seventh aspect, for performing a basic game and a side game, wherein: the step (e) includes the step of paying out a payment corresponding to a predetermined combination other than that of the jackpot, in a case where the players' cards include the predetermined combination.

A ninth aspect of the present invention is the card game playing method of the seventh or eighth aspect, for performing a basic game and a side game, the method further including the step of (f) accepting a side BET which is different from a normal BET, wherein: the step (e) includes the step of paying out a payment corresponding to that of the jackpot or the combination, in a case where a side BET is accepted from a player receiving the payment corresponding to the jackpot or the combination.

A tenth aspect of the present invention is a card game playing method, for performing a basic game and a side game, the method including the steps of: (a) dealing player's cards to a player having accepted participation entry, and dealing banker's cards to a banker, from a first card set consisting of plural kinds of cards, while in the basic game; (b) determining player's cards dealt to a player having accepted in excess of the number of players, based upon cards excluding the banker's cards dealt based upon the first card set, among a second card set consisting of cards included in the first card set, in a case where the number of players having accepted the participation exceeds a predetermined number of players; (c) dealing the player's cards determined in the step (b) to a player having accepted participation, while in the basic game; (d) determining a winner or loser, and paying out a payment, by comparing the players' cards with the banker's cards, while in the basic game; and (e) comparing all players' cards with the banker's cards in the basic game, paying out a payment of a jackpot to a player having a winning combination with a high payment, among plural kinds of combinations, and paying out a payment corresponding to a predetermined combination other than that of the jackpot, in a case where the players' cards include the predetermined combination, while in the side game.

An eleventh aspect of the present invention is the card game playing method of the tenth aspect, for performing a basic game and a side game, the method further including the step of (f) accepting a side BET which is different from a normal BET, wherein: the step (e) includes the step of paying out a payment corresponding to that of the jackpot or the combination, in a case where a side BET is accepted from a player receiving the payment corresponding to the jackpot or the combination.

BRIEF DESCRIPTION OF THE DRAWINGS

FIG. 14 is a view showing a data table showing a correspondence relationship between a winning combination of player's cards at the time of a side game and a payout type thereof, according to a second embodiment;

DESCRIPTION OF THE PREFERRED EMBODIMENTS

Figure 1A:
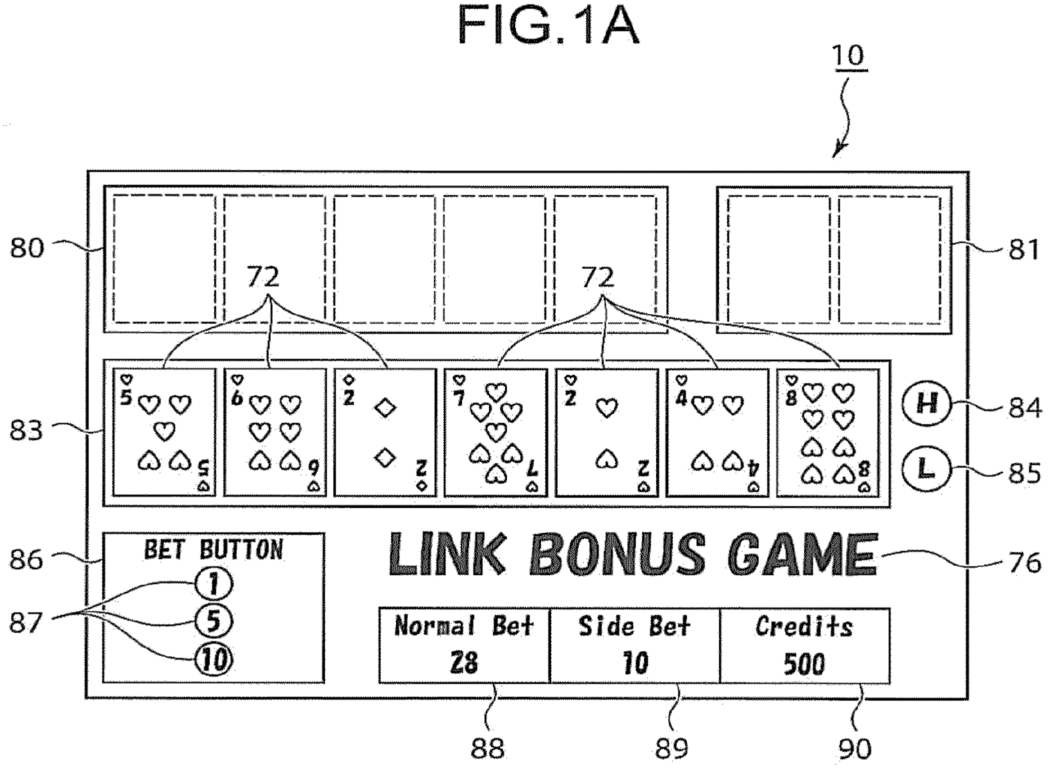
FIG. 1A is a view showing an exemplary image displayed on a liquid crystal display of each of stations, according to a first embodiment.

Hereinafter, a game machine 1 according to the present embodiment will be described in detail with referring to the drawings. In the embodiments that follow, when a PAIGOW poker is performed, in a case where entry has been made such that seven or more persons (exceeding a predetermined number of players) participate in the poker, cards are dealt to the players while a second card set is used. A game performed apart from a regular PAIGOW poker is defined as a side game.

First, the rules of the PAIGOW poker will be described in detail. In the PAIGOW poker of the present embodiment, one or more players complete against a banker with the use of one set of 52 trump cards (playing cards) excluding a joker.

Seven cards are dealt to each of the persons consisting of a banker and the players. Each of them divides seven cards into two groups of five cards and of two cards. At this time, a hand of five cards (a high hand) must be as strong as or must be stronger than that of two cards (a low hand).

Next, it is judged as to which one of the players' hands is strong or weak after comparing the five cards of each of the banker's and players' hands with each other. Similarly, it is judged as to which one of the players' hands is strong or weak after comparing the two cards of each of the banker's and players' hands with each other. In a case where the banker's hands are stronger in both of the two groups of five and two cards, it is judged to be the banker's win. In a case where one of the players' hands is stronger in both of the two groups of five and two cards, it is judged to be the player's win. In a case where the player's hands are stronger in one of the two groups consisting of five cards and two cards, and the banker's hand is stronger in the other one, it is judged to be "draw". In addition, in a case where the player's hand and the banker's hand are identical to each other in strength with respect to both of the two groups of five and two cards, it is judged to be the banker's win.

The hands of five cards include "Royal Flush", "Straight Flush", "Four of a Kind", "Full House", "Straight", "Three of a Kind", "Two of a Kind", and "No Pair" in order of strength. The hands of two cards include "One Pair" and "No Pair" in strength.

In addition, in a case where the player's and banker's hands are identical to each other, it is judged as to which one of the players' hands is strong or weak after comparing the numbers or alphabets drawn in cards constituting the hands with each other. The card's numbers and alphabets include "A", "K", "Q", "J", "10", "9", "8", "7", "6", "5", "4", "3", and "2" in sequential order from the strongest combination of the five cards.

In the embodiments that follow, a PAIGOW poker accepting a normal BET and a side BET is executed. The normal BET is to be performed for the play of the PAIGOW poker, and the side BET is stored in an accumulative manner as a jackpot (hereinafter, referred to as a JP) at a predetermined rate included in a betted currency value (50% in the embodiments of the present invention). The following embodiments describe a case in which a dealer takes over a banker.

Firstly, essential parts of the present invention will be described in detail with referring to FIG. 1. A banker and a plurality of players perform card games using a plurality of card sets consisting of a plurality of types. Further, they perform the PAIGOW poker as a basic game of the card games, and then, perform a side game (link bonus game). FIG. 1 is a view showing an exemplary image displayed on a liquid crystal display of each of the stations. Here, it is assumed that the number of players participating in games exceeds a predetermined number (six players). In other words, it is assumed that seven or more players participate therein. Each of the players performs a normal BET and a side BET, thereby starting the basic game. Further, the banker deals players' cards to six players having accepted participation entry from a first card set consisting of plural kinds of cards, and then, deals banker's cards. Furthermore, player's cards are dealt to a seventh player, based upon a second card set excluding the banker's cards dealt based upon the first card set. In this manner, the seventh player can participate, although it has been impossible to do so. Namely, no limitation applies to the number of participating players.

Next, the players divide the dealt player's cards into two groups of cards. Similarly, the banker divides the dealt banker's cards into two groups of cards. Then, the banker compares high hands of the cards of seven players with that of the banker's cards; and compares low hands of the cards of seven players with that of the banker's cards, thereby determining a winner or loser. Now, the basic game has completed.

Next, a side game is performed. As shown in FIG. 1, a side game display 76 is displayed while in the side game. At the lower side of a card arrangement position 83, the side game display 76 is displayed which is indicative of the fact that the side game is in progress. Here, it is shown that the players perform a side BET and a side BET display section 89 indicates that 10 coins are side-betted.

While in the basic game, the player determines five cards "5 of heart", "6 of heart", "7 of heart", "4 of heart", and "8 of heart" at high hand and two cards "2 of diamond" and "2 of heart" at low hand. Therefore, a winning combination of the player's cards at high hand is realized as a "Straight Flush".

Figure 1B:
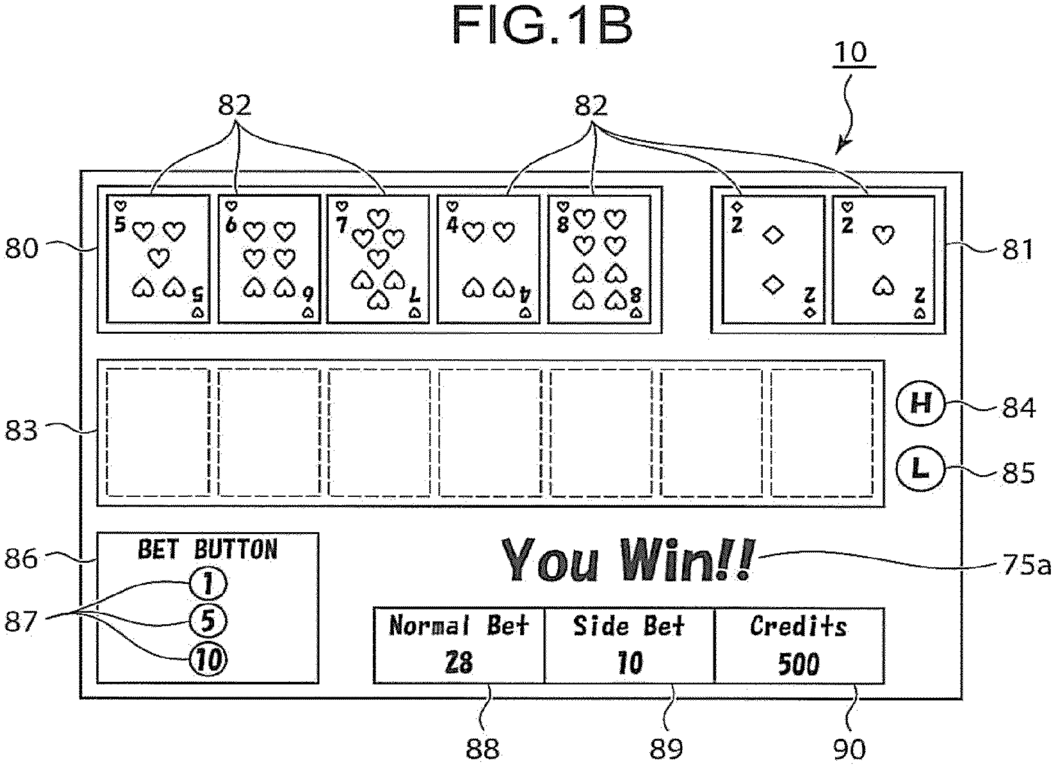
FIG. 1B is a view showing an exemplary image displayed on a liquid crystal display of each of the stations, according to the first embodiment.

While in the basic game, where a predetermined combination is realized at the hands (high hands) of the bankers and a plurality of players (where a poker combination is realized), the banker compares a winning combination among the hands of the banker and the plurality of players, and then, pays out a jackpot to a player having a winning combination with a high payment. In FIG. 1B, it is assumed that a winning combination of the player's cards at high hand is realized as a "Straight Flush", a predetermined combination is realized, and the combination with high payment is realized. The player accepts payout of the jackpot. Then, a winner-loser result is displayed as a winner-loser information display 75*a* (i.e., A message "You Win" is displayed, since the predetermined combination is realized.). Then, the accumulatively stored payment of the predetermined jackpot (JP) is paid out to this player.

Further, where a predetermined combination is realized at a certain hand (high hand) (where a poker combination is realized), the player accepts a payout other than the jackpot payout. In FIG. 1B, the combination of the player's cards at high hand is realized as a "Straight Flush", and the predetermined combination is realized. Then, the winner-loser result is displayed as the winner-loser information display 75*a* (i.e., A message "You Win" is displayed, since the predetermined combination is realized.). Then, this player accepts payout of a payment other than that of the jackpot payment. Further, where the banker accepts a side BET different from a normal BET, a payment according to the combination is paid out.

Figure 2:
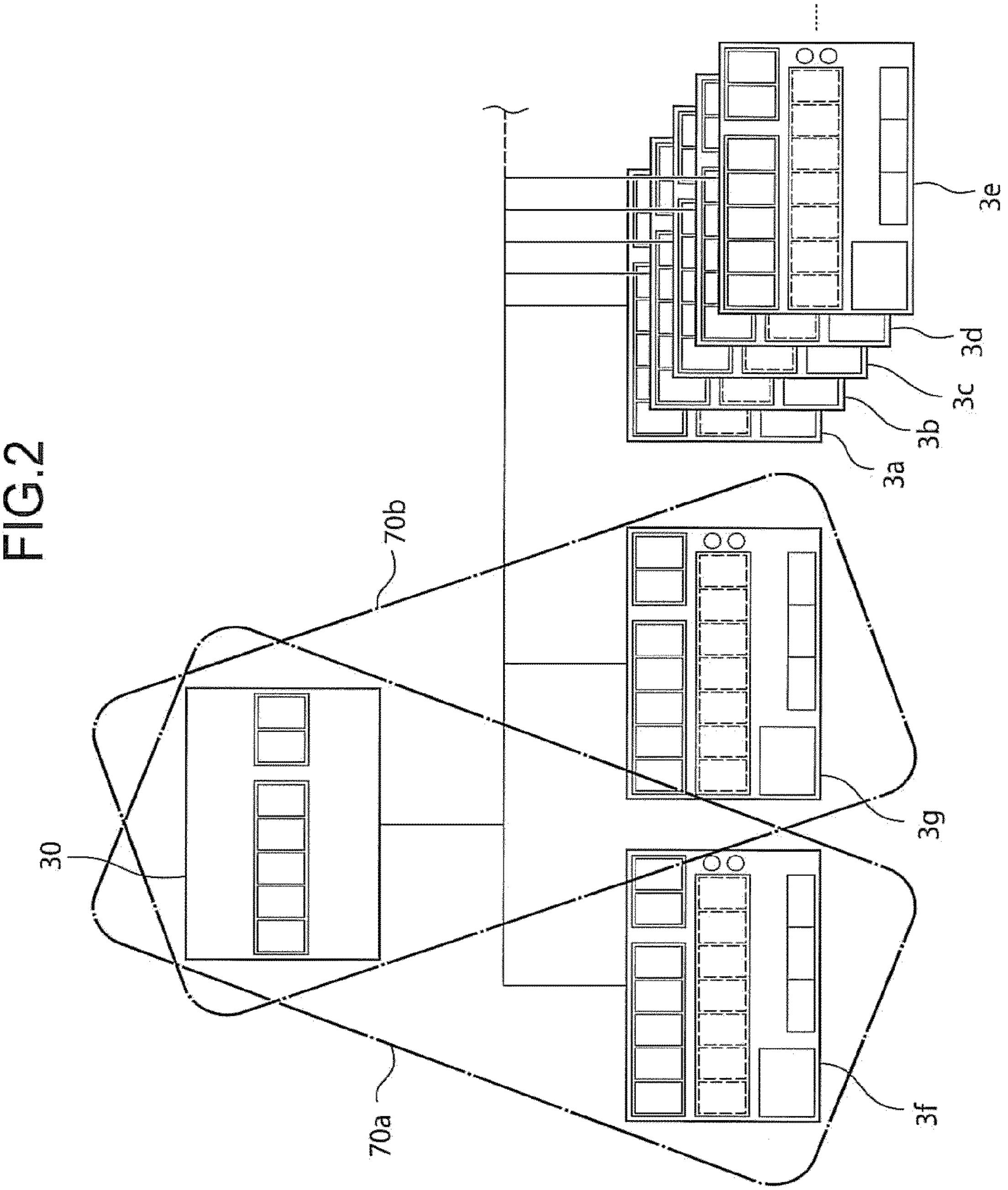
FIG. 2 is a correlative view showing a relationship of card sets used in a game machine according to the first embodiment.

FIG. 2 is a correlative view showing a relationship of card sets used in the game machine according to the first embodiment. As shown in the figure, a banker 30 starts a game after accepting participation of players. Among a first card set 70*a* (one card set) consisting of plural kinds of cards used in this game, the banker deals seven cards (a predetermined number of cards) as player's cards 72 to each of players 3*a* to 3*f* having accepted participation, and then, deals seven cards as the banker's cards. Namely, the cards of the first card set 70*a* are dealt to each of the players 3*a* to 3*f*.

Next, within a second card set 70*b* consisting of cards identical to those of the first card set, the banker deals seven player's cards to the seventh player having accepted participation, from among cards excluding the banker's cards dealt based upon the first card set 70*a*. Here, the cards of a second card set 70*b* are dealt to a player 3*g*.

Next, the player, as described in FIG. 1, divides the dealt player's cards 72 into two groups of cards (high hand and low hand). Similarly, the banker divides the dealt banker's cards into two groups of cards. Then, the banker compares the high hands of the seven players' cards with that of the banker's cards, and then, compares the low hands of these players' cards with that of the banker's cards, thereby determining a winner or loser.

In this manner, gaming can be performed while the banker's cards are used in common, and seven players can participate in games, although it has been impossible to do so insofar. Namely, no limitation applies to the number of participating players. Further, in the present embodiment, it may be possible to arrange the player's cards so that each of the players can view their faces, determine a payment, based upon a winning combination of those included in the player's cards, and pay out the determined payout to each of the players. In the present embodiment, further, a side BET, which is different from a normal BET, is accepted, a payment is determined based upon a winning combination of the player's cards of the player having accepted a side BET among the players' cards.

Figure 3:
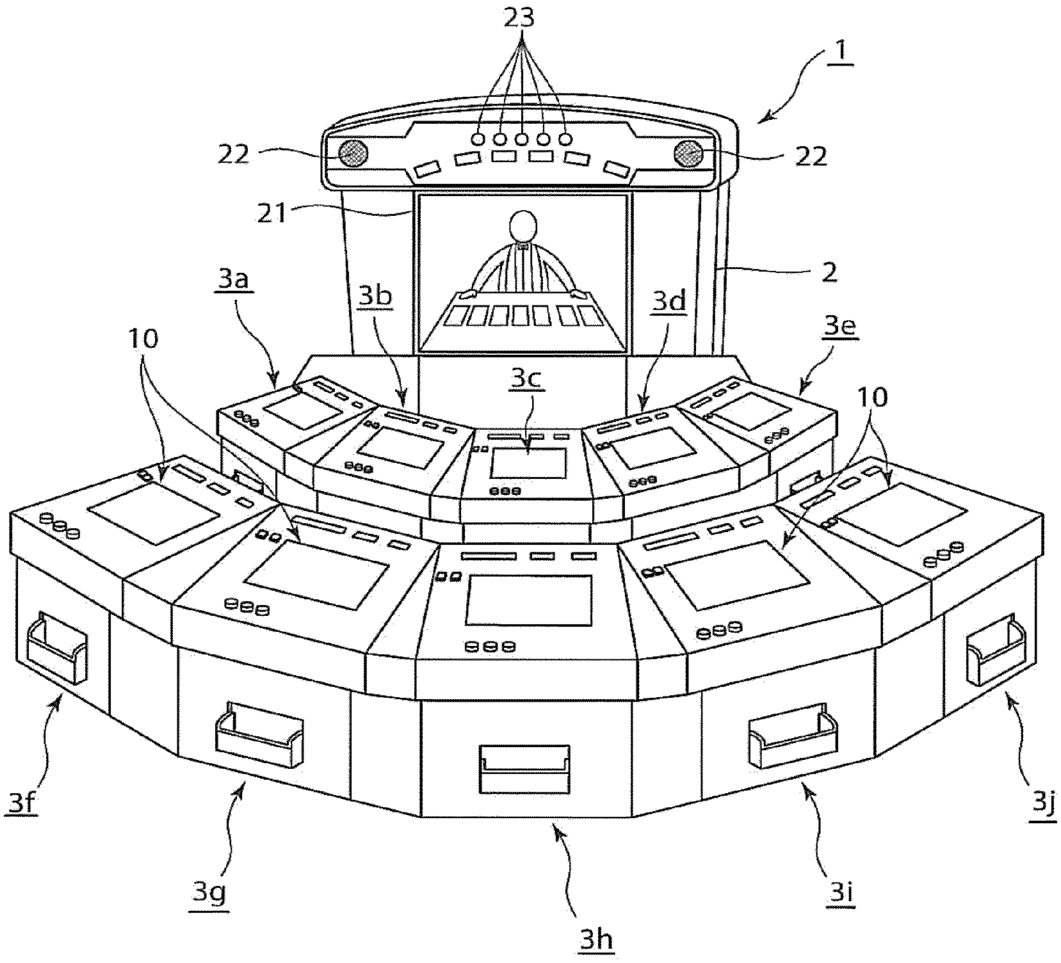
FIG. 3 is a perspective view schematically depicting the game machine according to the first embodiment.

FIG. 3 is a perspective view schematically depicting an appearance and a configuration of the game machine according to the first embodiment of the present invention. As shown in the figure, the game machine 1 is basically comprised of a main monitor 2 and ten stations 3 (stations 3*a* to 3*j*). While the first embodiment describes in detail a case in which the game machine 1 is provided with a plurality of stations 3 (ten stations), the game machine may be provided with more than ten stations, in the present invention. These stations are provided corresponding to respective ones of a plurality of players, and are equivalent to a plurality of input devices accepting participation entry of the players.

A front panel display 21 is provided at the center part of a main monitor 2, and an image indicative of a dealer and cards is displayed. The front panel display 21 is equivalent to a display device of the present invention. In addition, provided at the upper side of the main monitor 2 are: a speaker 22 for outputting music or effect sounds in accordance with the progress of a game executed by the game machine 1; and an LED23 that is lit at the time of various effects. The front panel display 21 is equivalent to a common display used in common by a plurality of players, of the present embodiment.

Figure 4:
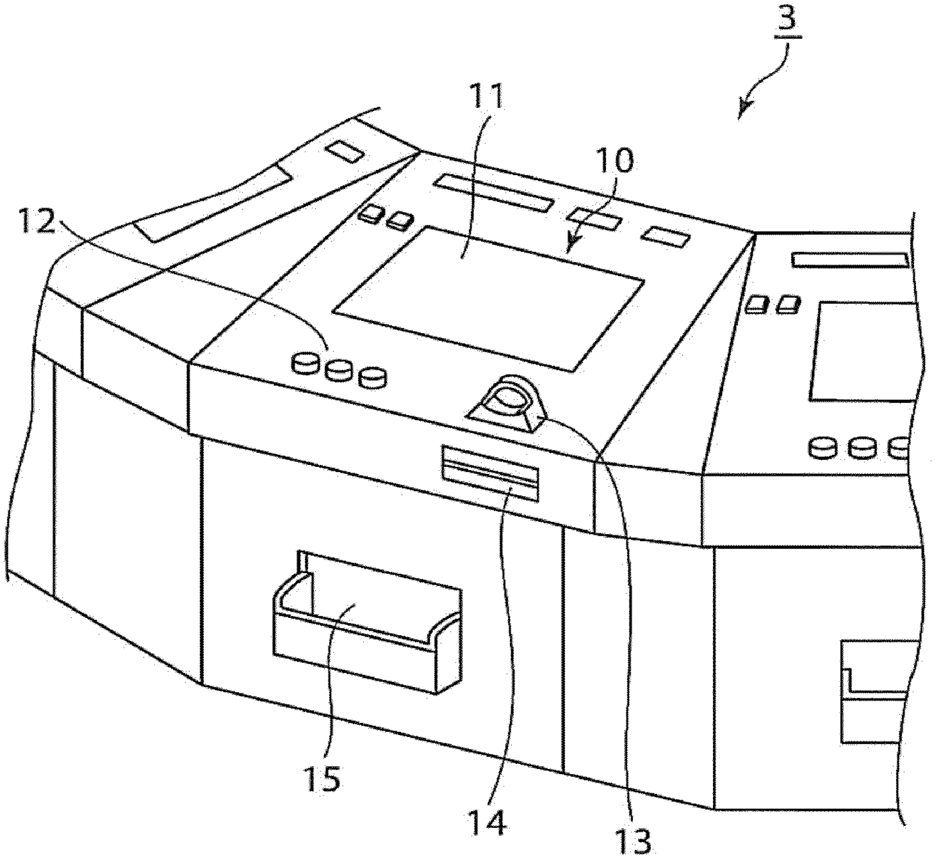
FIG. 4 is a perspective view schematically depicting an appearance and a configuration of each of the stations included in the game machine according to the first embodiment.

FIG. 4 is a perspective view schematically depicting an appearance and a configuration of the station included in the game machine shown in FIG. 3. As depicted in FIG. 4, at the upper center of the station 3, a liquid crystal display 10 is provided which displays an image pertinent to operation or the like (see FIG. 5). The station 3 is provided for a respective one of a plurality of players, and is equivalent to a respective one of the plurality of input devices accepting participation entry of the player. Further, a plurality of liquid crystal displays 10 are equivalent to a plurality of display devices provided corresponding to respective ones of the plurality of players in the present invention.

In addition, a touch panel 11 for inputting operations such as BET is provided on the upper face of the liquid crystal display 10. The touch panel 11 is equivalent to a normal BET switch, a side BET switch, and an input switch, according to the present invention.

An operational button 12 for making payout operation and a coin insertion slot 13 for inserting coins or medals are provided in front of the liquid crystal display 10. A bill insertion slot 14 for inserting bills is provided at the front top right end of the station 3. Provided downwardly of the bill insertion slot 14 is a coin payout opening 15 through which the coins or medals corresponding to stored credit are paid out to the players when a payout operation is made.

Figure 5:
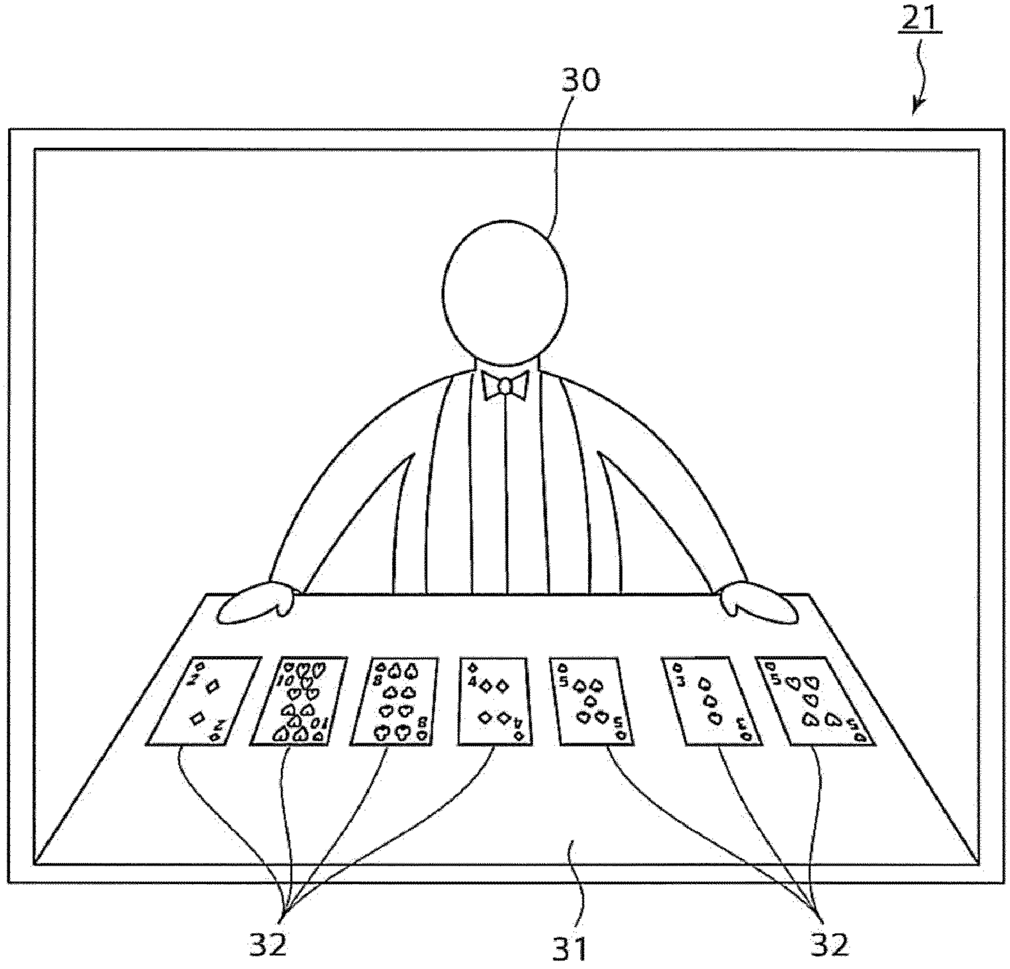
FIG. 5 is a view showing an exemplary image displayed on a front panel display included in the game machine according to the first embodiment.

FIG. 5 is a view showing an exemplary image displayed on a front panel display included in a game machine. As shown in the figure, the front panel display 21 displays: a dealer image 30 which is indicative of a dealer (banker); a table image 31 which is indicative of a table; and a card image 32 which is indicative of seven banker's cards. The card image 32 is displayed in a faced down manner when cards are dealt to the dealer. When a high hand and a low hand are determined, the card image 32 is displayed in a faced up manner. In FIG. 5, the left five cards toward the banker indicate a high hand, and the right two cards indicate a low hand.

Figure 6:
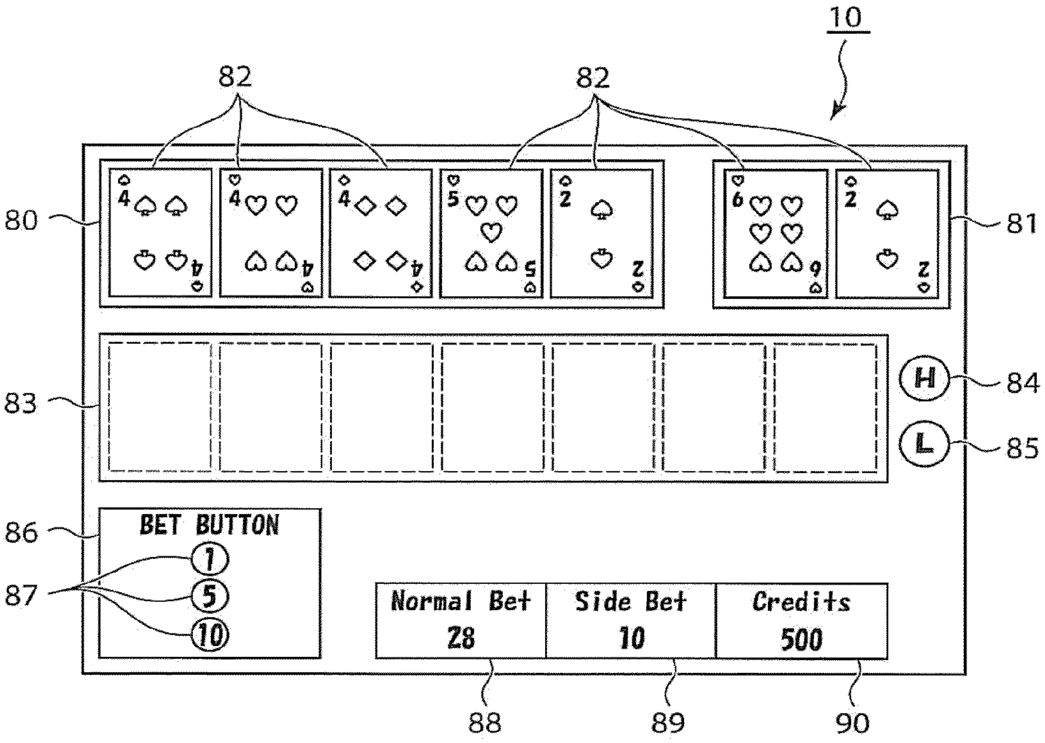
FIG. 6 is a view showing an exemplary image displayed on a liquid crystal display included in each of the stations, according to the first embodiment.

FIG. 6 is a view showing an exemplary image displayed on a liquid crystal display included in each of stations. As shown in the figure, a high hand display section 80, which displays a player's high hand, and a low hand display section 81, which displays a low hand, are provided at the upper side of the liquid crystal display 10. The high hand display section 80 and the low hand display section 81 display card images 82 which indicative of high hand cards and low hand cards, respectively, in a faced up manner.

A dealt-card display section 83 is provided at the lower side of the high hand display section 80. A card image indicative of the seven player's cards dealt to each of the players is displayed in a faced up manner at seven portions enclosed by the dotted line of the dealt-card display section 83. A high hand determination button 84 and a low hand determination button 85, for determining cards constituting a high hand and a low hand, are provided at the right side of the dealt-card display section 83. A player can determine a high hand by selecting a card desired to be high hand, via a touch panel 11, from among the cards displayed at the dealt-card display section 83, and then, operating the high hand determination button 84. The cards determined to be a high hand are displayed at the high hand display section 80. Similarly, the player determines a low hand by selecting cards desired to be a low hand, via the touch panel 11, from among the cards displayed at the dealt-card display section 83, followed by operating a low hand determination button 85 via the touch panel 11.

A BET button display section 86 is provided at the lower side of the dealt-card display section 83. The BET button display section 86 displays a BET button 87 for inputting a BET number. The player can input a normal BET number and a side BET number by operating a BET button 87 via the touch panel 11.

A normal BET number display section 88, which displays the number of normally betted coins, is provided at the right side of the BET button display section 86. It is shown here that 28 coins have been betted. In a case where betting of these 28 coins is input, the player may operate "10" of the BET button 87 twice, "5" of the BET button 87 once, and "1" of the BET button 87 three times.

A side BET number display section 89, which displays the number of side-betted coins, is provided at the right side of a normal BET number display section 88. It is shown here that 10 coins have been betted. A credit number display section 90 is provided at the right side of the side BET number display section 89. In the figure, it is shown here that 500 coins have been credited.

Figure 7:
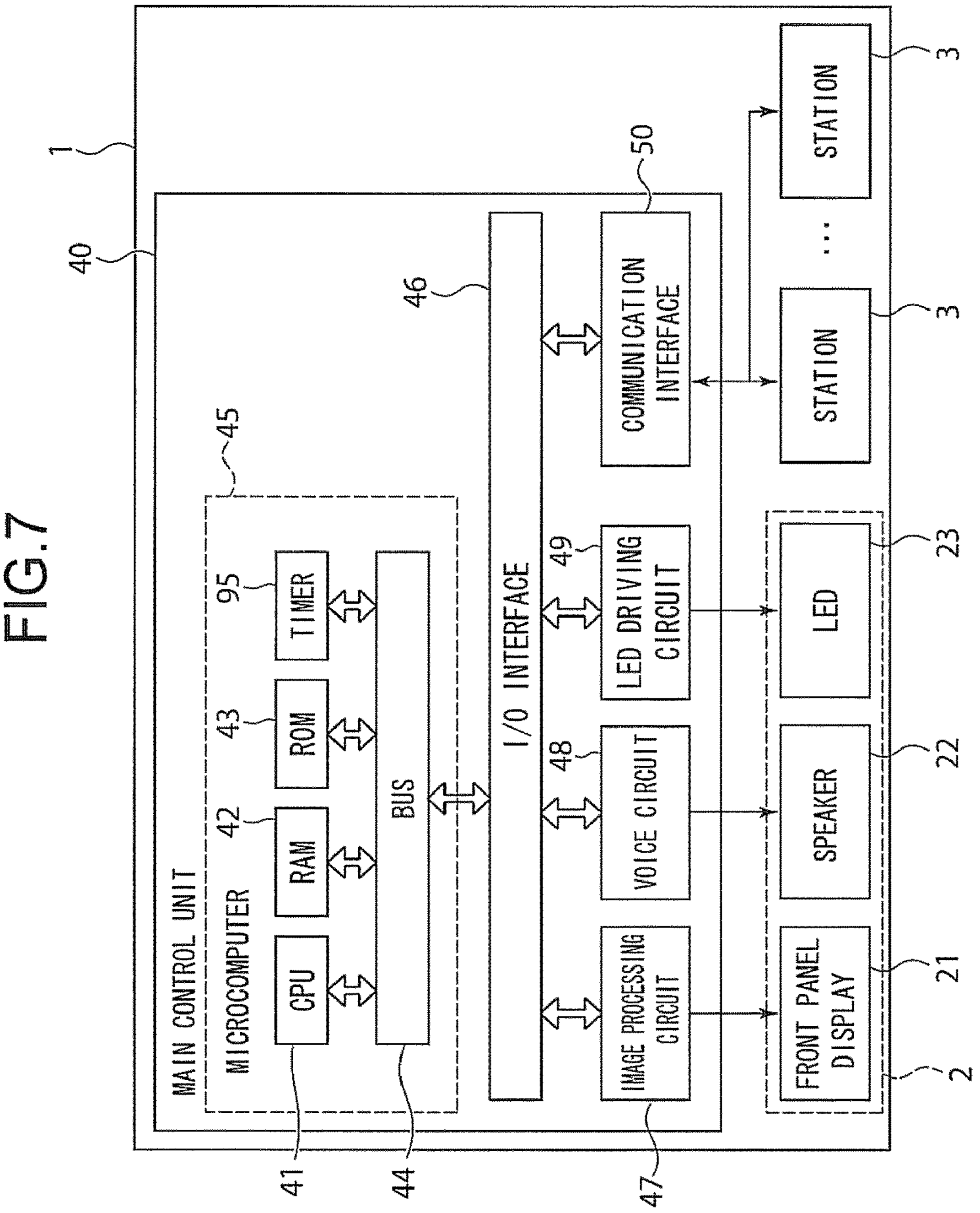
FIG. 7 is a block diagram depicting the game machine shown in FIG. 3.

FIG. 7 is a block diagram depicting an internal configuration of a game machine shown in FIG. 3. As depicted in the figure, a main control unit 40 included in the game machine 1 is basically constituted while microcomputers 45 made up of a CPU41 (controller), a RAM42 (memory), a ROM43 (memory), a timer 95, and a bus 44 for transferring data therebetween are employed as a base. The CPU41 of the main control unit 40 is equivalent to a controller in the present invention. The CPU41 controls equipment such as the front panel display 21, the stations 3, the RAM42, and the ROM43, which were connected in order to conduct a game, and then, conducts games. The CPU41 is connected, via an I/O interface 46, to an image processing circuit 47, a voice circuit 48, an LED driving circuit 49, and a communication interface 50.

The ROM43 stores a variety of programs or data tables and the like, for performing processing required for controlling the game machine 1.

The RAM42 is a memory for temporarily storing a variety of data computed by the CPU41. The variety of data includes: the first card set data inclusive of the plural types of card data; the second card set data inclusive of card data identical to that of a card included in the first card set data; the number of players having accepted entry for participation by the input device; and a payment data table, which is based upon combinations of cards. The RAM42 is equivalent to a memory. In addition, a timer 95 performs time measurement.

A front panel display 21 constituting a main monitor 2 is connected to the image processing circuit 47; a speaker 22 constituting the main monitor 2 is connected to the voice circuit 48; and the LED23 constituting the main monitor 2 is connected to the LED driving circuit 49. Ten stations 3 are connected to the communication interface 50.

The CPU41 conducts games (a PAIGOW poker and a side game) in the game machine 1, based upon: game programs (including a PAIGOW poker game program and a side-game program) stored in the ROM43; and various signals to be received from stations 3. In addition, the CPU41 displays images on the front panel display 21, based upon the above game program, outputs a sound from the speaker 22, and then, illuminates the LED23. In addition, the CPU41 transmits various signals to each of stations 3, based upon the above-mentioned game programs. In the present invention, the CPU41 is equivalent to a controller for controlling the display device, the input device, and the memory.

Figure 8:
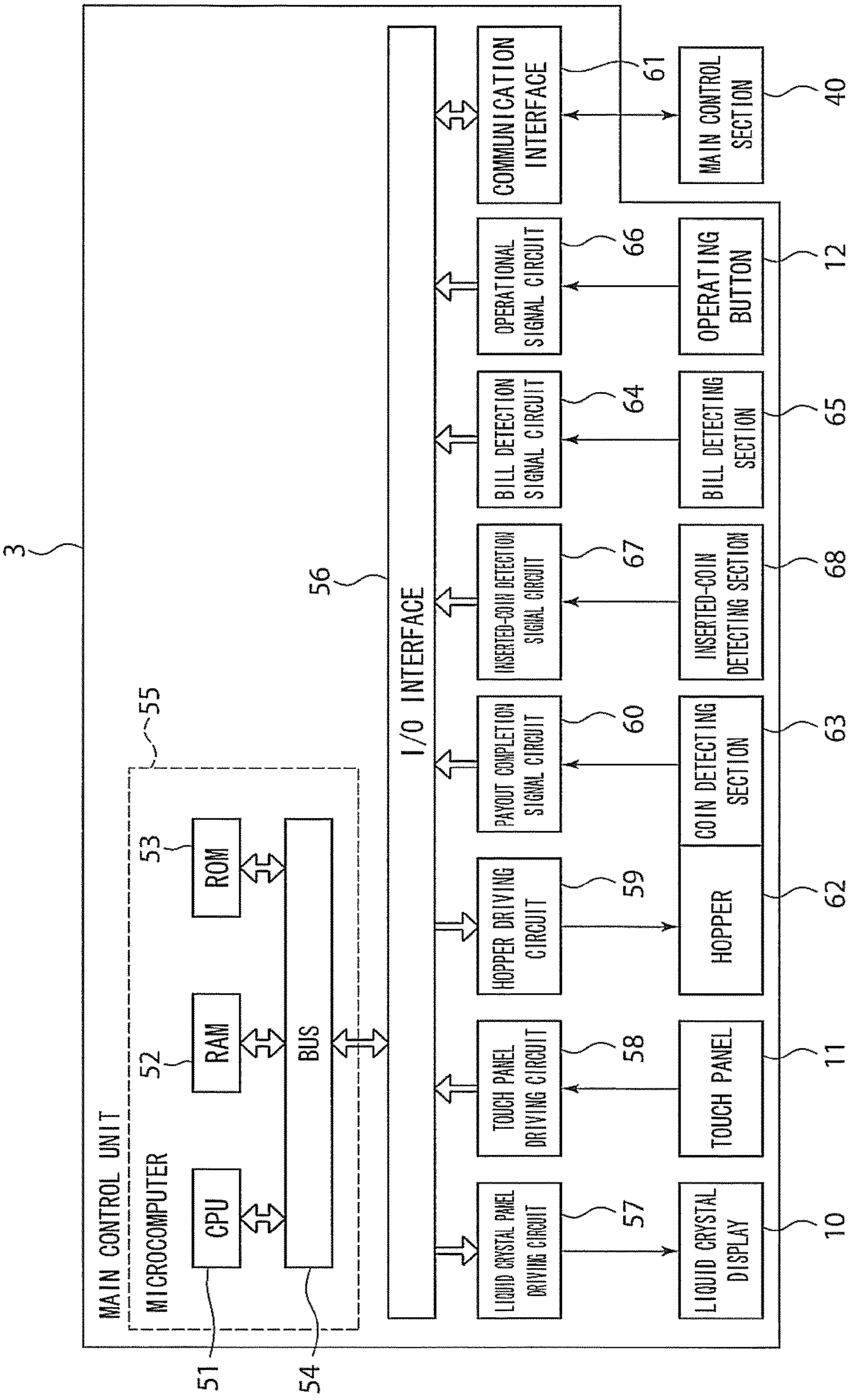
FIG. 8 is a block diagram depicting an internal configuration of the station included in the game machine shown in FIG. 4.

FIG. 8 is a block diagram depicting an internal configuration of stations included in the game machine shown in FIG. 2. As depicted in FIG. 8, stations 3 are basically constituted while microcomputers 55 made up of a CPU51, a RAM52, a ROM53, and a bus 54 for transferring data therebetween are employed as a base.

The ROM53 stores a variety of programs and data tables or the like, for performing processing required for controlling stations 3. In addition, the RAM52 temporarily stores the credit number currently stored in stations 3 and a variety of data computed by the CPU51.

In addition, the CPU51 is connected, via an I/O interface 56, to a liquid crystal panel driving circuit 57; a touch panel driving circuit 58; a hopper driving circuit 59; a payout complete signal circuit 60; an inserted-coin detection signal circuit 67; a bill detection signal circuit 64; an operation signal circuit 66; and a communication interface 61.

The liquid crystal display 10 is connected to the liquid crystal panel driving circuit 57; the touch panel 11 is connected to the touch panel driving circuit 58; a hopper 62 is connected to a hopper driving circuit 59; a coin detecting section 63 is connected to the payout complete signal circuit 60; an inserted-coin detecting section 68 is connected to the inserted-coin detection signal circuit 67; a bill detecting section 65 is connected to the bill detection signal circuit 64; and the operational button 12 is connected to the operation signal circuit 66, respectively.

The hopper 62 serves to pay out coins from the coin payout opening 15, based upon a control signal output from the CPU51. The coin detecting section 63 is provided inside the coin payout opening 15, and transmits signals to the CPU51 in a case where it is detected that a predetermined number of coins have been paid out from the coin payout opening 15.

Upon detecting that coins have been inserted through the coin insertion slot 13, the inserted-coin detecting section 68 detects the amount of the detected coins, and then, transmits to the CPU51 a detection signal indicative of the detected amount. The detected coins are stored in the RAM52 while a predetermined amount is handled as one credit.

At the time of acceptance of bills, the bill detecting section 65 detects the amount of the accepted bills, and then, transmits to the CPU51 a detection signal indicating the detected amount. The detected bills are stored in the RAM52 while the predetermined amount is handled as one credit. The operation button 12 is intended for performing payout operation in a case where coin payout has been determined.

Figure 9A:
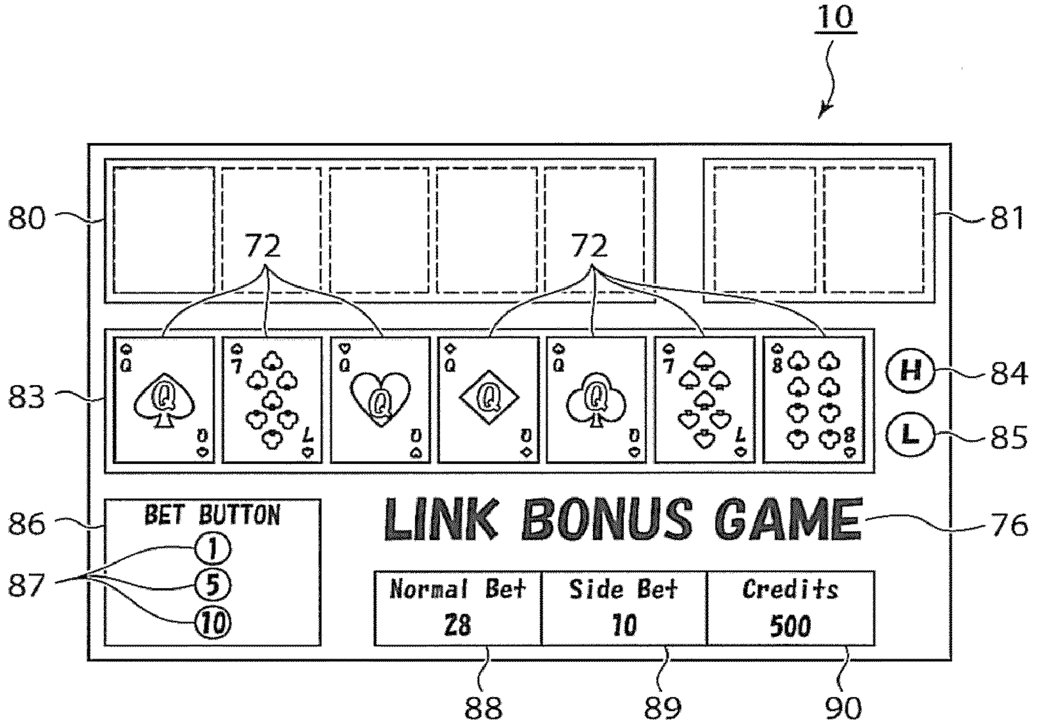
FIG. 9A is a view showing an exemplary image displayed on the liquid crystal display of the game machine according to the first embodiment.
Figure 9B:
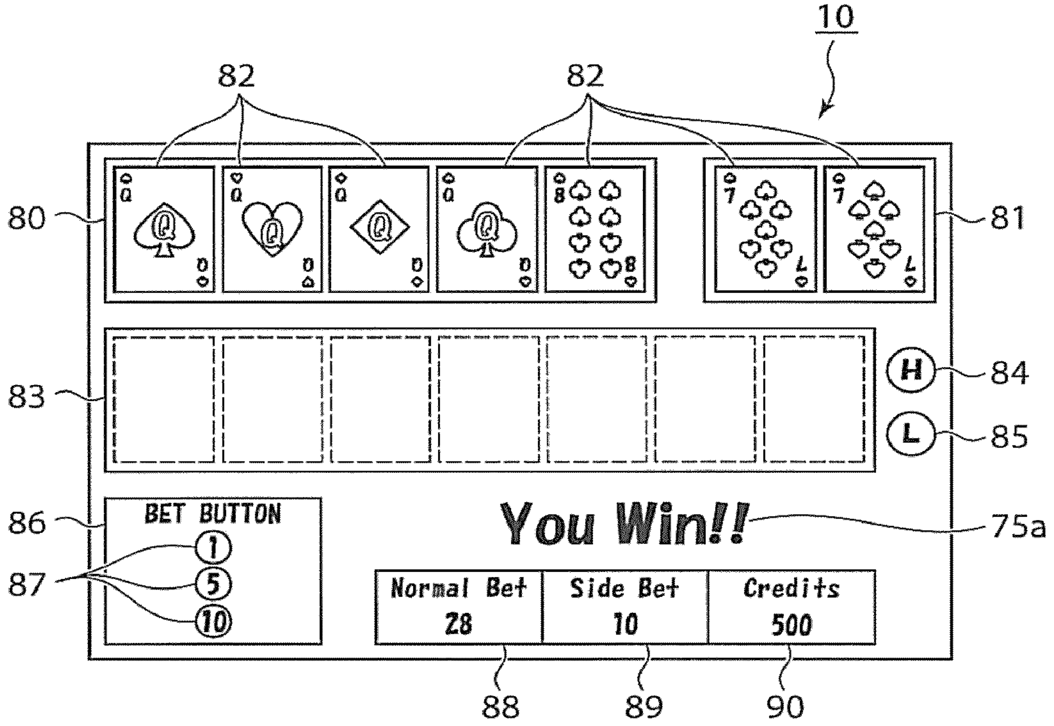
FIG. 9B is a view showing an exemplary image displayed on the liquid crystal display of the game machine according to the first embodiment.

FIGS. 9A and 9B are views each showing an exemplary image displayed on the liquid crystal display at each of the stations, while in a side game, according to the first embodiment. Hereinafter, a case of performing a side BET will be described by way of example.

As shown in FIG. 9A, a high hand display section 80, which displays a high hand, and a low hand display section 81, which displays a low hand, are provided at a liquid crystal display 10 of a station 3. From cards 72 dealt to a station (station 3*a*) at which a player operates, the player can determine the high hand by operating a high hand determination button 84 via a touch panel 11, and can determine the low hand by operating a low hand determination button 85 via the touch panel 11. At the lower side thereof, five cards of the high hand and two cards of the low hand are displayed at the high hand display section 80 and the low hand display section 81, respectively. At the lower side thereof, further, a dealt-card display section 83, which displays an image of the dealt card, is provided.

The cards dealt to the player in this example are: "Queen of spade"; "7 of club"; "Queen of heart"; "Queen of diamond"; "Queen of club"; "7 of spade"; and "8 of club". At the lower side of the dealt-card display section 83, a side game display 76 is displayed which is indicative of the fact that a side game is in progress. At the lower side of the dealt-card display section 83, further, a BET button display section 86 is provided. BET buttons 87 for inputting BET numbers are displayed at the BET button display section 86. The player can input a normal BET number and a side BET number by operating the BET buttons 87 via the touch panel 11. At the right side of the BET button display section 86, furthermore, a normal BET number display section 88 is provided which displays the number of normally betted coins. Here, it is shown that 28 coins have been betted. Where a BET of the 28 coins is input, the player may operate "10" of the BET buttons 87 twice, "5" of the BET buttons 87 once, and "1" of the BET buttons 87 three times. Here, it is shown that the player performs a side BET and the side BET number display section displays the fact that ten coins have been side-betted. Further, the credit amount display section 90 is provided at the right side of the side BET number display section 89. Here, it is shown that 500 coins have been credited.

As shown in FIG. 9B, the player determines five cards "Queen of spade", "Queen of heart", "Queen of diamond", "Queen of club", and "8 of club" at high hand and two cards "7 of club" and "7 of spade" at low hand. A winning combination of cards at the player's high hand is realized as a "Four of a Kind".

Further, where a predetermined combination is realized in each of the banker's and players' hands, namely, where a poker combination is realized, the banker determines a winner or loser at high hand by comparing five cards of the player's high hand with those of the banker's high hand, at which the predetermined combination is realized. Here, the combination of the player's cards is realized as a "Four of a Kind". Further, it is assumed that a high combination is realized in comparison between five cards of the banker's high hand and those of the player's high hand, at which another predetermined combination is realized. The winner-loser result is displayed as a winner-loser information display 75*a* ("You Win") at the lower side of the dealt-card display section 83. Then, a predetermined payment is paid out to this player.

Figure 10A:
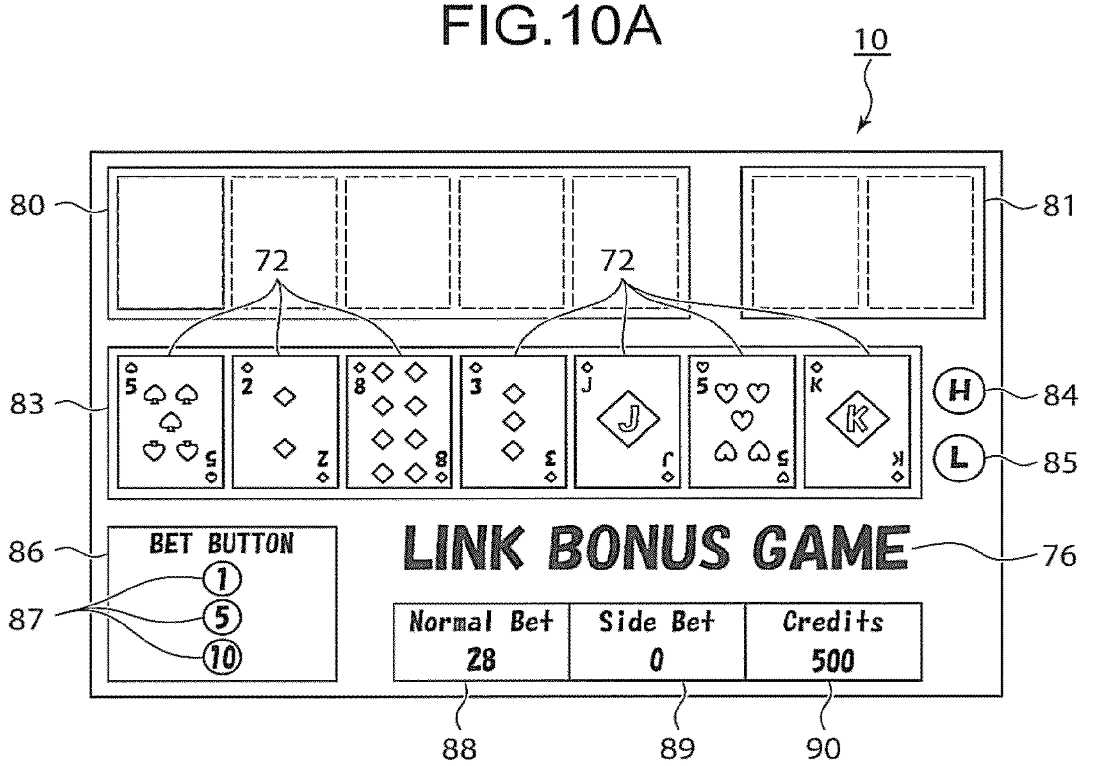
FIG. 10A is a view showing an exemplary image displayed on the liquid crystal display included in each of the stations, while in a side game, according to the first embodiment.
Figure 10B:
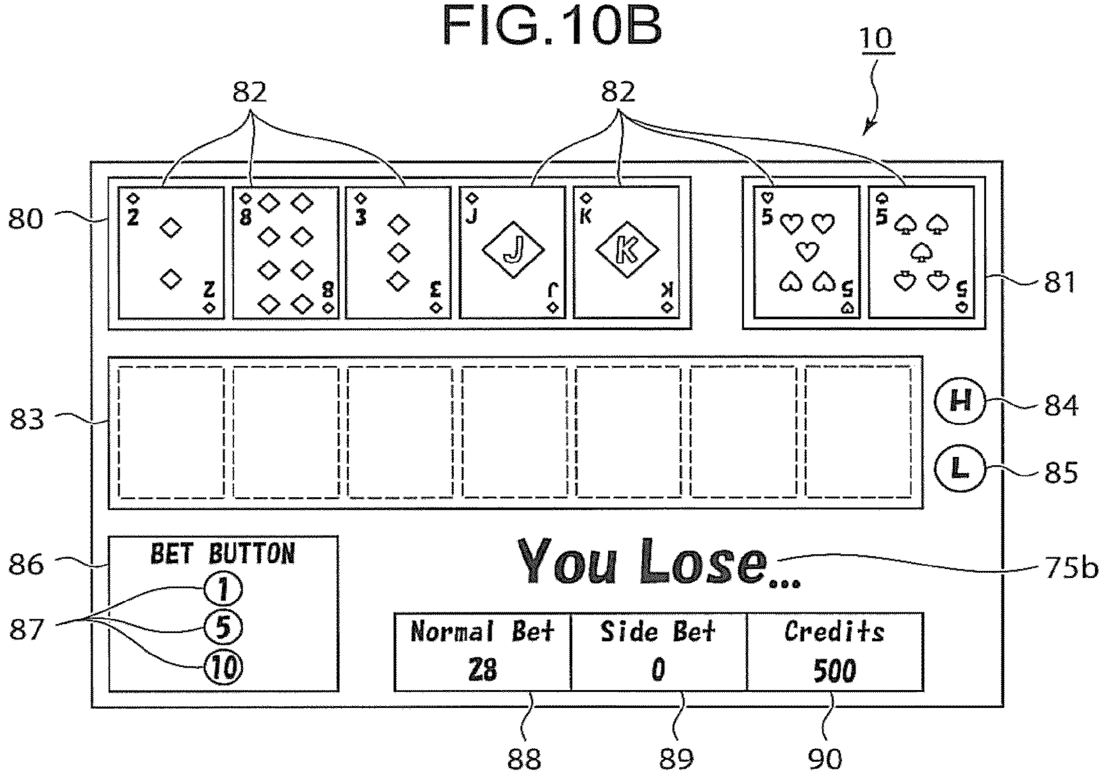
FIG. 10B is a view showing an exemplary image displayed on the liquid crystal display included in each of the stations, while in a side game, according to the first embodiment.

FIGS. 10A and 10B are views each showing an exemplary image displayed on a liquid crystal display of a station, while in a side game, according to the first embodiment. As shown in FIG. 3, the game machine 1 is made up of a main monitor 2 and 10 stations 3 (3*a* to 3*j*). Hereinafter, a case in which no side BET is performed will be described by way of example.

As shown in FIG. 10A, a high hand display section 80, which displays a high hand, and a low hand display section 81, which displays a low hand, are provided at a liquid crystal display 10 of a station 3. From the cards 72 dealt to the station at which a player operates (here, station 3*a*), the player can determine a high hand by operating a high hand determination button 84 via a touch panel 11 and can determine a low hand by operating a low hand determination button 85 via the touch panel 11. At the lower side thereof, five cards of the high hand are displayed at the high hand display section 80, and two cards of the low hand are displayed at the low hand display section, respectively. At the lower side thereof, further, a dealt-card display section 83 is provided which displays an image of the dealt cards.

The cards dealt to the player in this example are "5 of spade", "2 of diamond", "8 of diamond", "3 of diamond", "Jack of diamond", "5 of heart", and "King of diamond". At the lower side of the dealt-card display section 83, a side game display 76 is displayed which is indicative of the fact that a side game is in progress. At the lower side of the dealt-card display section 83, further, a BET button display section 86 is provided. A BET button 87 for inputting a BET number is displayed at the BET button display section 86. The player can input a normal BET number and a side BET number by operating a BET button 87 via the touch panel 11. At the right side of the BET button display section 86, further, a normal BET number display section 88 is provided which displays the number of side-betted coins. Here, it is shown that 28 coins have been betted. Where a BET of 28 coins is input, the player may operate "10" of the BET button 87 twice; "5" of the BET button 87 once; and "1" of the BET button 87 three times. Here, it is shown that, in spite of the player's attempt to perform a side BET, the side BET display section 89 displays "0", which is indicative of the fact that no side BET is performed. At the right side of the side BET display section 89, further, a credit amount display section 90 is provided. Here, it is shown that 500 coins are credited.

As shown in FIG. 10B, the player determines five cards "2 of diamond", "8 of diamond", "3 of diamond", "Jack of diamond", and "Kind of diamond" at high hand, and determines two cards "5 of heart" and "5 of spade" at low hand. A winning combination of the player's cards at high hand is realized as a "Flush".

Here, no side BET has been performed, and no predetermined condition has been met, thus resulting in the player's loss. The winner-loser result is displayed as a winner-loser information display 75*a* ("You Lose") situated at the lower side of the dealt-card display section 83.

Figure 11A:
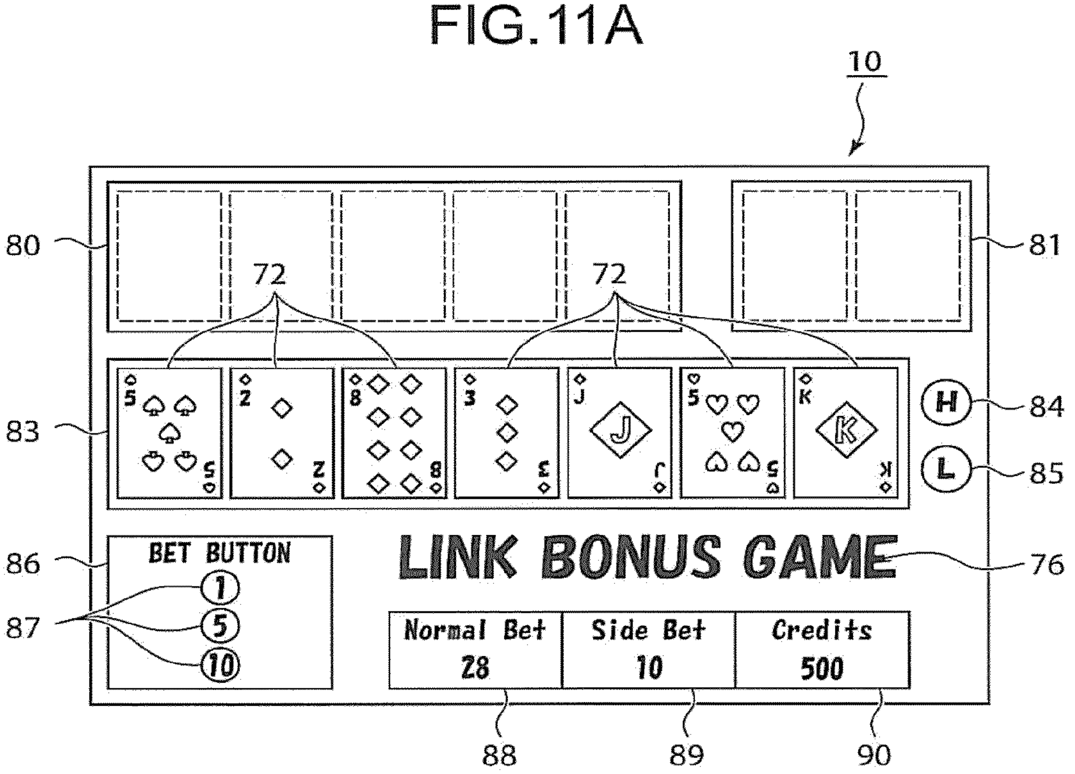
FIG. 11A is a view showing an exemplary image displayed on the liquid crystal display included in each of the stations, while in a side game, according to the first embodiment.
Figure 11B:
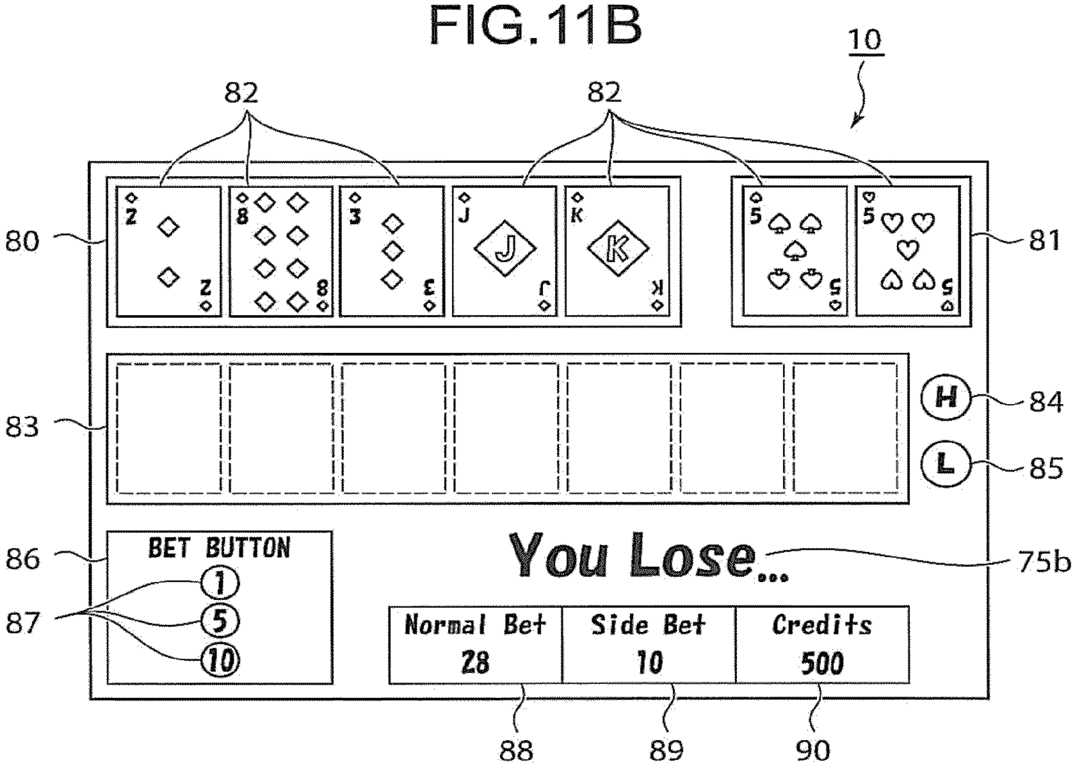
FIG. 11B is a view showing an exemplary image displayed on the liquid crystal display included in each of the stations, while in a side game, according to the first embodiment.

FIGS. 11A and 11B are views each showing an exemplary image of displayed on a liquid crystal display of a station, while in a side game, according to the first embodiment. Here, a case in which a side BET is performed will be described by way of example.

As shown in FIG. 11A, a high hand display section 80, which displays a high hand, and a low hand display section 81, which displays a low hand, are provided at the liquid crystal display 10 of the station 3. From the cards 72 dealt to the station at which a player operates (here, station 3*a*), the player can determine a high hand by operating a high hand determination button 84 via a touch panel 11 and can determine a low hand by operating a low hand determination button 85 via the touch panel 11. At the lower side thereof, the five cards at high hand are displayed at the high hand display section 80, and the two cards at low hand are displayed at the low hand display section, respectively. At the lower side thereof, further, a dealt-card display section 83 is provided which displays an image of the dealt cards.

The cards dealt to the player in this example are "5 of spade", "2 of diamond", "8 of diamond", "3 of diamond", "Jack of diamond", "5 of heart", and "King of diamond". At the lower side of the dealt-card display section 83, a side game display 76 is displayed which is indicative of the fact that a side game is in progress. At the lower side of the dealt-card display section 83, further, a BET button display section 86 is provided. A BET button 87 for inputting a BET number is displayed at the BET button display section 86. The player can input a normal BET number and a side BET number by operating a BET button 87 via the touch panel 11. At the right side of the BET button display section 86, further, a normal BET number display section 88 is provided which displays the number of side-betted coins. Here, it is shown that 28 coins have been betted. Where a BET of 28 coins is input, the player may operate "10" of the BET button 87 twice; "5" of the BET button 87 once; and "1" of the BET button 87 three times. It is shown that the player performs a side BET, and then, the side BET number display section 89 indicates that 10 coins are side-betted. At the right side of the side BET display section 89, further, a credit amount display section 90 is provided. Here, it is shown that 500 coins are credited.

As shown in FIG. 11B, the player determines five cards "2 of diamond", "8 of diamond", "3 of diamond", "Jack of diamond", and "Kind of diamond" at high hand, and determines two cards "5 of heart" and "5 of spade" at low hand. A winning card combination of the player's cards at high hand is realized as a "Flush".

Where a predetermined combination is realized in all of the banker's and players' hands, namely, where a poker combination is realized, the winner or loser at high hand is determined by comparing five cards of the banker's high hand with those of the player's high hand, at which the predetermined combination, i.e., the poker combination was realized. Here, a winning combination of the player's cards at high hand is realized as a "Flush". Further, it is assumed that a high combination is not realized among the five cards of each of the banker's and other player's high hands, at which the predetermined combination was realized. The winner-loser result is displayed as a winner-loser information display 75*a* situated at the lower side of the dealt-card display section 83 (A message "You Lose" is displayed, since the player has been defeated).

Figure 12A:
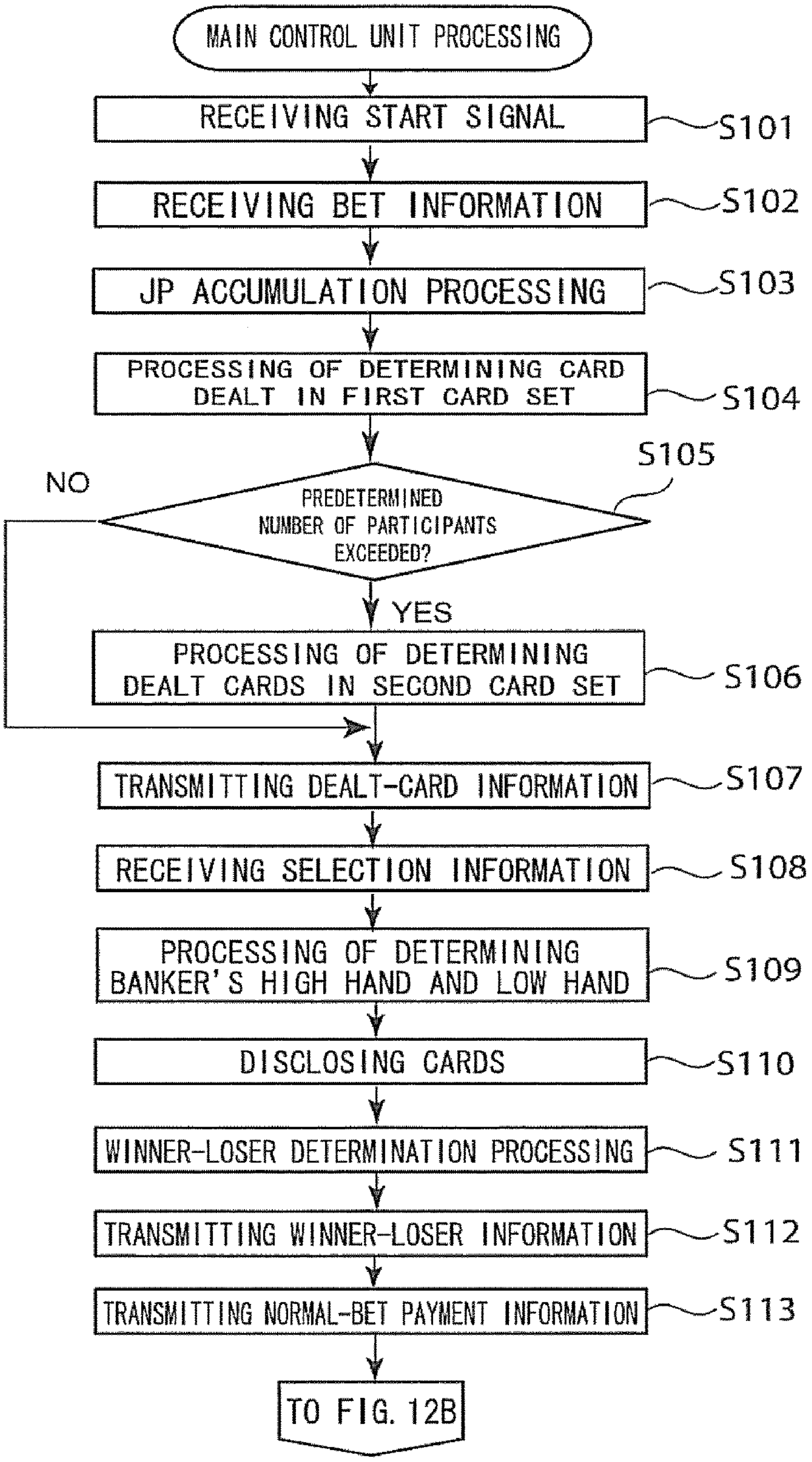
FIG. 12A is a flowchart showing main control unit processing executed at a main control unit included in the game machine according to the first embodiment.
Figure 12B:
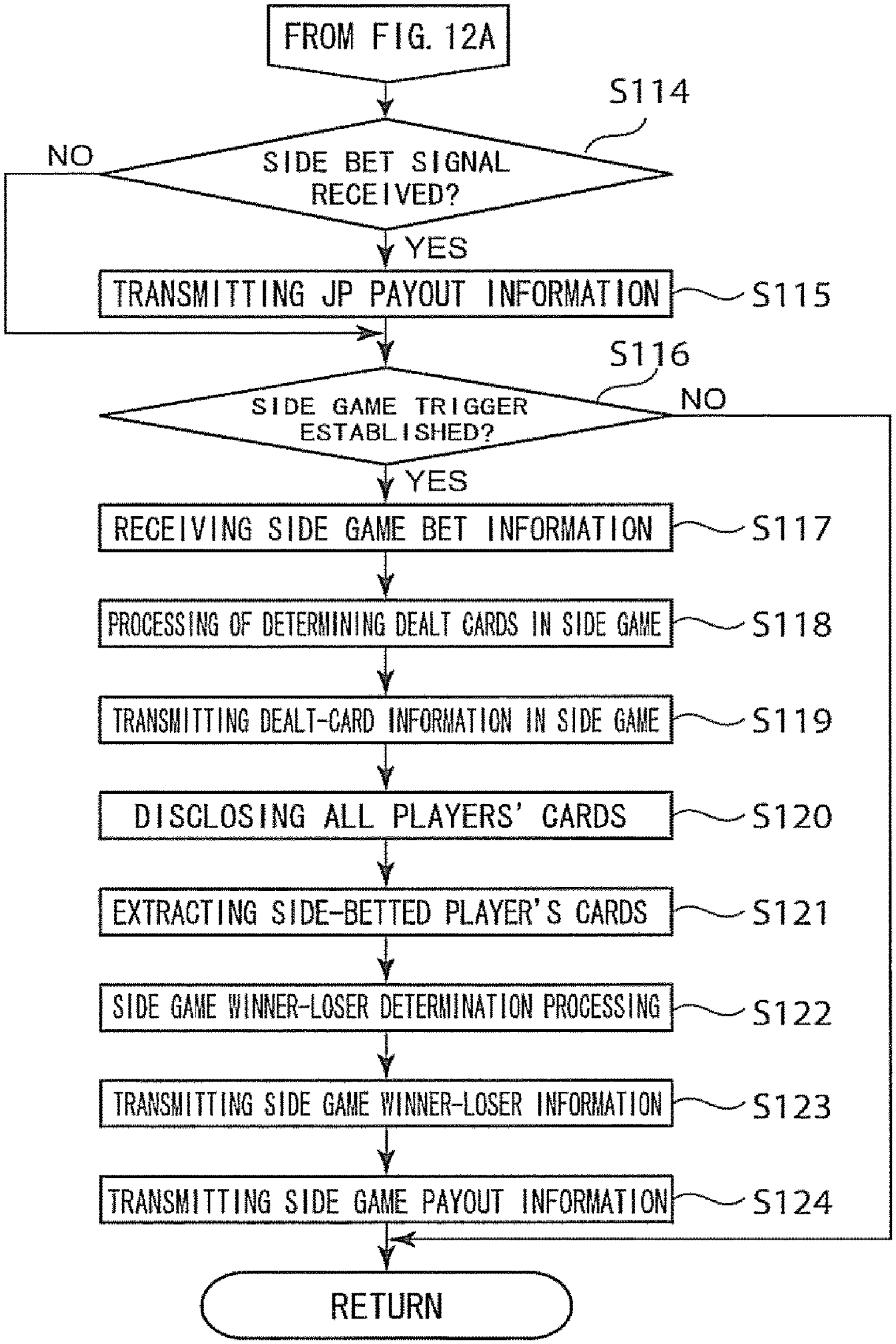
FIG. 12B is a flowchart showing main control unit processing executed at a main control emit included in the game machine according to the first embodiment.

Next, a processing operation performed at the main control unit 40 and a station 3 will be described in detail. FIGS. 12A and 12B are flowcharts each showing main control unit processing executed at a main control unit included in the game machine according to the first embodiment.

As shown in FIG. 12A, in the main control unit processing, at first, start signal reception processing is performed (step S101). In this processing operation, a CPU41 included in the main control unit 40 receives a start signal from a station 3. Specifically, the CPU41 receives a start signal from any one of the stations 3. Namely, the CPU41 accepts the player's participation. The start signal is obtained when it is triggered for conducting a PAIGOW poker game in the game machine 1.

Next, the CPU41 receives BET information from a station 3 (see FIG. 2) (step S102). The BET information is relevant to BET, and includes: information indicative of whether or not a normal BET and a side BET have been performed; and information indicative of the amounts of the normal BET and the side BET. Namely, this CPU executes processing of accepting the normal BET and the side BET that is different therefrom.

Next, the CPU41 executes JP accumulation processing (step S103). Specifically, the CPU41 accumulatively stores, in the RAM42 (see FIG. 6), 50% (predetermined rate) of the side-betted credit as JP, based upon the BET information received at step S102.

Next, the CPU41 executes processing of determining cards dealt in a first card set (step S104). In this processing operation, the CPU41 determines banker's cards and players' cards, the players' cards being dealt to players having accepted entry for participation from the input device, based upon data of the first card set made of plural types of cards stored in the RAM42. Namely, seven cards to be dealt to each of the persons consisting of the players and the banker are determined from among one set of trump cards. The seven cards determined to be dealt to the player are equivalent to the player's card, and the seven cards determined to be dealt to the banker are equivalent to the banker's card. In addition, the CPU41 displays, in a faced down manner, the card images indicative of seven banker's cards, on the front panel display 21 (see FIG. 2) included in the game machine 1.

Next, the CPU41 judges whether or not the number of participants exceeds a predetermined number (step S105). In this processing operation, the CPU41 accepts participation from the station 3, and then, judges whether or not the number of players stored in the RAM42 exceeds a predetermined number of players. In the present embodiment, the predetermined number is 6. In a case where the judgment result is affirmative (S105: Yes), this CPU performs processing of determining cards dealt in the second card set (S106). If the above result is negative (S105: No), the routine proceeds to step S107.

Next, the CPU41 performs processing of determining cards dealt in the second card set (step S106). In this processing operation, the CPU41 reads data of the second card set made of cards identical to the first card set stored in the RAM42. Then, this CPU determines the players' cards dealt to the players having accepted participation in excess of the predetermined number of players, based upon the card data excluding the banker's cards dealt based upon the first card set.

Next, the CPU41 transmits dealt-card information (step S107). Specifically, the CPU41 transmits the dealt-card information to a station 3. Namely, the player's cards determined at step S104 or step S106 are dealt to the players having accepted participation. The dealt-card information includes information indicative of types of cards (numbers and marks (heart, club, spade, and diamond)) determined to be dealt to the players and the banker. At the station 3, based upon the received dealt-card information, the liquid crystal display 10 displays card images indicative of seven player's cards, and then, accepts entry for dividing the images into a group of five cards (high hand) and a group of two cards (low hand).

Next, the CPU41 receives selection information from the station 3 (step S108). The selection information indicates which one of the cards dealt to the players has been selected as a high hand, and which one of the cards have been selected as a low hand.

Next, the CPU41 executes processing of determining a banker's high hand and low hand (step S109). In this processing operation, the CPU41 executes processing of dividing the cards dealt to the banker into a high hand and a low hand.

Next, the CPU41 discloses cards (step S110). Specifically, the CPU41 displays in a faced up manner on the front panel display 21 the card images indicative of the high hand and the low hand determined at the step S109.

Next, the CPU41 performs winner-loser determination processing (step S111). In this processing operation, the CPU41 executes processing of determining a winner or loser, based upon the selection information received at the step S108 and the high hand and the low hand determined at step S109. Namely, this CPU executes processing of determining a winner or loser after comparing the players' hands of the cards dealt to the players and the banker's card hands. Specifically, it is judged as to which one of the players' hands is strong or weak after comparing the players' high hands with the banker's high hand. In addition, it is also judged as to which one is strong or weak after comparing the players' low hands with the banker's low hand. Further, the winner or loser is determined based upon the judgment results. Specifically, in a case where the player's high hand is stronger than the banker's high hand and in a case where the player's low hand is stronger than the banker's low hand, it is judged to be the player's win. In a case where the banker's high hand is stronger than the player's high hand and in a case where the banker's low hand is stronger than the player's low hand, it is judged to be the banker's win. Even if the player is stronger at one of the high and low hands, in a case where the banker is stronger at the other one, it is judged to be “draw”.

Next, the CPU41 transmits winner-loser information (step S112). Specifically, the CPU41 transmits to the station 3 the information indicative of the winner or loser determined at the step S111 (hereinafter, referred to as winner-loser information). Upon the receipt of the winner-loser information, based upon the received winner-loser information, the liquid crystal display 10 displays any one of the images inclusive of messages “You Win”, “You Lose”, and “Draw”.

Next, the CPU41 performs processing of transmitting normal-BET payout information (step S113). In this processing operation, the CPU41 transmits the normal-BET payout information to the station 3. The normal-BET payout information is generally indicative of an amount of credit (currency values) to be paid out to BET. Specifically, in a case where the player has won, this CPU transmits information indicative of credit of which amount is twice of that of normal BET. In a case where the outcome of the game is “draw”, the CPU transmits information indicative of credit of which amount is equal to that of normal BET. In addition, in a case where the banker has won, the CPU transmits information indicative of the fact that an amount of given credit is 0.

Next, in FIG. 12B, the CPU41 judges whether or not a side BET signal has been received (step S114). Specifically, the CPU41 judges whether or not a signal has been received indicative of the fact that the side BET has been performed. When the CPU41 judges that no side BET signal has been received (step S114: NO), the routine proceeds to step S116.

On the other hand, when it is judged that a side BET signal is received (step S114: YES), JP payout information is transmitted to the station 3 (step S115). The JP payout information is indicative of the amount of JP credit (currency value) to be paid out to the side BET. Specifically, in a case where the player has won, when a winning combination of the player's cards at high hand is realized as a "Royal Flush", the CPU41 transmits information which is indicative of credit equivalent to a total amount of JP. When a winning combination of the player's cards at high hand is realized as a "Straight Flush", this CPU transmits information which is indicative of credit equivalent to 50% of JP, and when the player's cards at high hand is realized as any other winning combination, this CPU transmits information which is indicative of a credit equivalent to 10% of JP. In addition, in the case where the result is "draw", this CPU transmits information which is indicative of a credit of which amount is equal to that of a side BET. Moreover, in a case where the banker has won, this CPU transmits the fact that the amount of credit given is 0.

While the embodiment of the present invention describes a case in which, when the player has won in a PAIGOW poker at the time of side BET, where a winning combination of the player's cards at high hand is realized as a "Royal Flush", 100% of JP is given, where it is realized as a "Straight Flush", 50% of JP is given, and where it is realized as any other combination, 10% of JP is given. In the embodiment of the present invention, a correspondence relationship between the amount of JP given and a hand is not limitative thereto. In the present invention, further, in a case where the player has won in the PAIGOW poker at the time of side BET, all of the currency values accumulatively stored as JP may be given, regardless of the hand.

While the embodiment of the present invention described a case in which a correspondence relationship between a player's hand and a payment (JP) to be paid out, in the PAIGOW poker at the time of side BET, is preset, the correspondence relationship between the player's hands and the payments to be paid out may be randomly varied every time the PAIGOW poker is performed at the time of a side BET, in the present invention.

Further, while the embodiment of the present invention described a case of paying out credit of which amount is equal to that of side BET in a case where the result is "draw", the above payout of the credit may not be performed.

Next, the CPU41 judges whether or not a side game trigger is established (step S116). Specifically, the CPU41 executes the programs stored in the ROM43, thereby sampling random number values from among the numeric range of predetermined random number values, followed by judging whether or not a side game trigger is established based upon the sampled random number values. The CPU41 terminates main control unit processing when it executes the processing of step S114 upon judging that a side game trigger has not been established (step S116: NO).

On the other hand, upon judging that a side game trigger has been established (step S116: YES), the CPU41 receives side game BET information from the station 3 (see FIG. 2) (step S117).

Next, the CPU41 executes processing of determining deal cards in a side game (step S118). In this processing operation, specifically, the CPU41 determines the dealt cards in the basic game as those for the side game as it is. Alternatively, the CPU41 randomly determines five cards dealt to each of the players, from among one or plural groups of trump cards.

Next, the CPU41 transmits side game dealt-card information (step S119). Specifically, the CPU41 transmits the side game dealt-card information to the station 3. The side game dealt-card information is inclusive of information which is indicative of the kinds (numbers or alphabets and suits (heart, club, spade, and diamond) of the cards determined to be dealt to the players. At the station 3, based upon the received dealt-card information, the liquid crystal display 10 displays a card image which is indicative of five player's cards. Alternatively, the five player's cards at high hand, which were dealt in advance, may be used.

Next, the CPU41 discloses all players' cards (step S120). Specifically, the CPU41 causes the front panel display 21 to display in a faced up manner, on a player-by-player basis, a card image of the five player's cards that were determined at step S118. Here, each of the players can view the arranged cards.

Next, the CPU41 extracts the side betted player's cards (step S121). Specifically, the CPU41 extracts five side betted player's cards, based upon the side game BET information received at step S117.

Next, the CPU41 performs side game winner-loser determination processing (step S122). In this processing operation, the CPU41 executes processing of determining a winner or loser, based upon cards of the side game of all players having accepted the side BET disclosed at step S120. Namely, this CPU determines a payment, based upon a winning combination of cards included in the player's cards displayed on a front panel display 21. The CPU41 determines a payment in accordance with a payment data table that is based upon the predetermined combinations stored in the RAM42. For example, in a case where wining combinations of giving a payment include a "straight" and the player's winning combination is realized as a "straight" (see FIG. 9), processing is performed so that a predetermined payment can be given to this player. Namely, a payment is given to the strongest combination while the players' cards are compared with each other. Specifically, it is judged as to which one of the players' hands is strong or weak after comparing all of the players' cards, and a winner or loser is determined based upon the judgment result. Here, any one of the predetermined combinations is established in the five player's cards, and it is judged as to which one of the players' cards is strong or weak. The predetermined combinations designate "Royal Flush", "Straight Flush", "Four of a Kind", "Full House", "Flush", "Straight", "Three of a Kind", "Two Pairs", "One Pair", and "No Pair" in sequential order from the strongest combination of the five cards.

Next, the CPU41 transmits side game winner-loser information (step S123). Specifically, the CPU41 transmits to a station 3 the winner-loser information indicative of a winner or loser of the side game determined at step S122. The station 3 displays any one of the images inclusive of the messages "You Win", "You Lose", and "Draw" on the liquid crystal display 10, based upon winner-loser information, upon the receipt of the winner-loser information (see FIGS. 9B and 10).

Next, the CPU41 transmits side game payout information to the station 3 (step S124). The side game payout information is indicative of the amount of credit (currency value) to be paid out to the side game. The CPU41 determines a payment payout information), based upon the side game winner-loser information, and then, transmits payout information to the station 3. Namely, the determined payment is given to the player. Specifically, the CPU41 transmits information which is indicative of the credit determined based upon the winning combinations "Royal Flush", "Straight Flush", "Four of a Kind", "Full House", "Flush", "Straight", "Three of a Kind", "Two Pairs", "One Pair", and "No Pair". The CPU41 terminates main control unit processing when executing the processing of step S124.

Figure 13A:
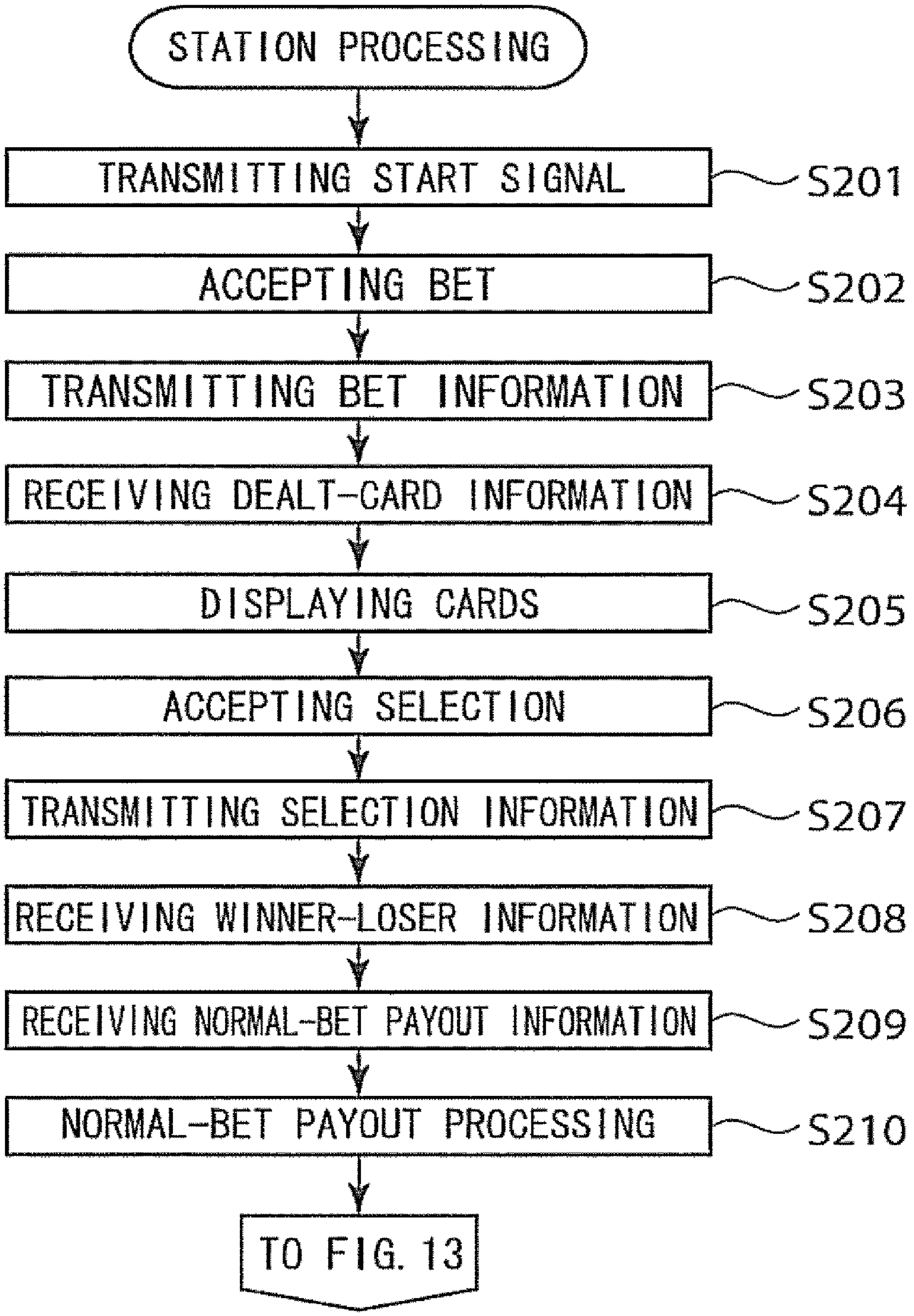
FIG. 13A is a flowchart showing a subroutine of station processing executed at each of the stations, according to the first embodiment.
Figure 13B:
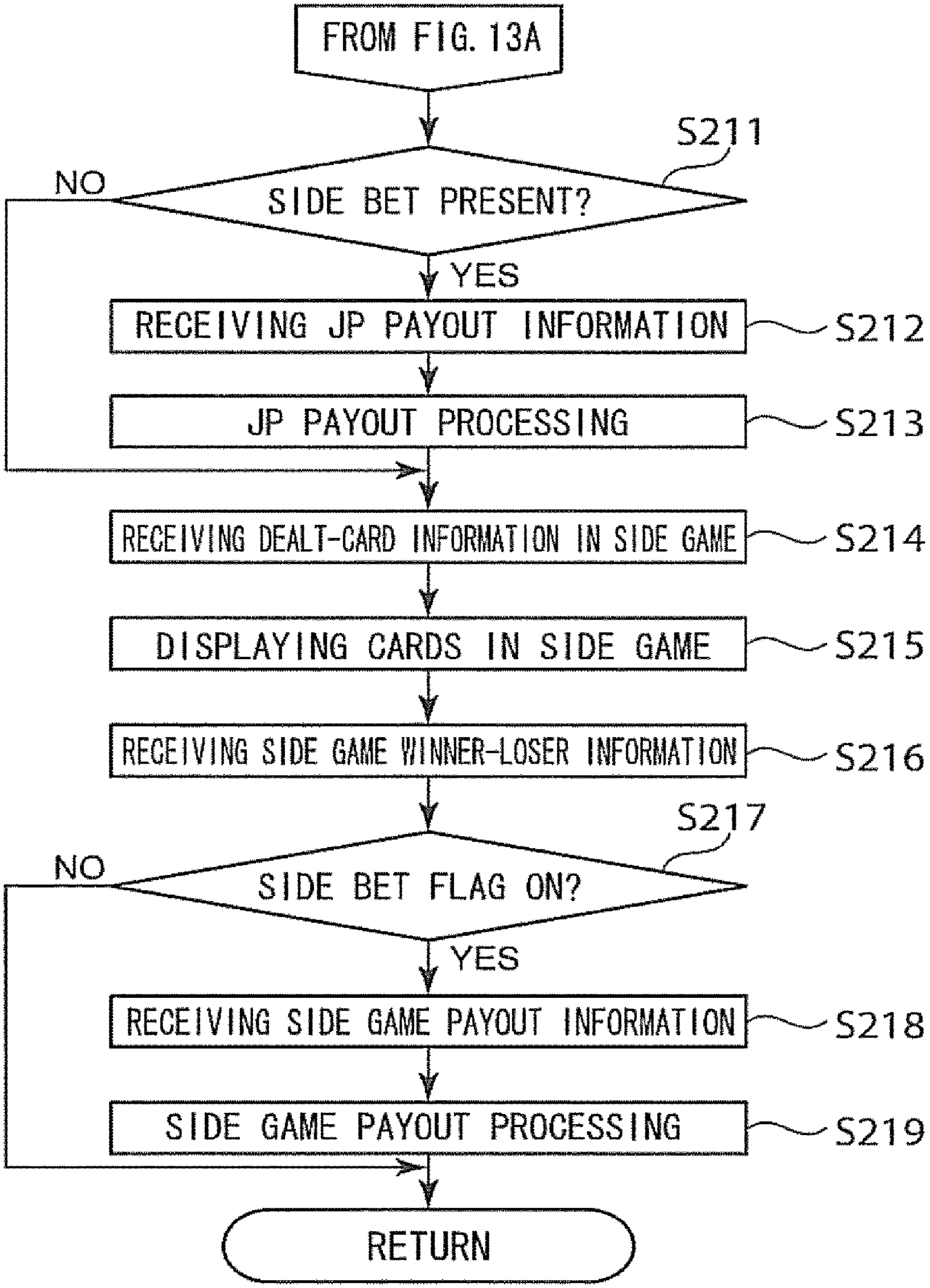
FIG. 13B is a flowchart showing a subroutine of station processing executed at each of the stations, according to the first embodiment.

Next, the processing performed at the station 3 will be described in detail. FIGS. 13A and 13B are flowcharts showing subroutines of the station processing executed at the station, according to the first embodiment. In the station processing, first, a CPU51 included in the station 3 performs start signal transmission processing (step S201). In this processing operation, the CPU51 transmits a start signal to the main control unit 40 upon the receipt of a signal indicative of the fact that the touch panel 11 has sensed a touch or that the inserted-coin detecting section 68 has detected coin insertion. In this manner, the processing operations shown in FIGS. 12A and 12B are executed at the main control unit 40.

Next, the CPU51 accepts entries of the normal BET and side BET (step S202). This allows the player to input the normal BET and the side BET via the touch panel 11 included in the station 3. Upon the receipt of a signal indicative of the fact that entry of the side BET has been made, the CPU51 sets a side-BET flag. This side-BET flag is set in a case where entry of the side BET has been made.

Next, the CPU51 transmits to the main control unit 40, BET information serving as information pertinent to an input BET (step S203). Upon the receipt of the BET information, the main control unit 40 determines cards to be dealt to the players and the banker (see step S103 of FIG. 12A).

Next, the CPU51 receives from the main control unit 40 the dealt-card information indicative of the cards dealt to the players (step S204). Specifically, the CPU51 receives the dealt-card information transmitted at step S104 of FIG. 12A, and then, stores the received information in a RAM.

Next, the CPU51 displays cards (step S205). Specifically, the CPU51 displays, at the dealt-card display section 83 of the liquid crystal display 10 corresponding to the players having accepted entry for participation, the card images indicative of the seven player's cards, based upon the players' card information stored in a RAM52, which were received at step S204. In addition, such display processing is also executed for the display devices corresponding to the players having accepted entry for participation in excess of a limited number of players.

Next, the CPU51 accepts entry for selecting high hands and low hands (step S206). This allows the players to determine high hands and low hands from among the dealt cards by operating high and low hand determination buttons 84 and 85 via a touch panel 11.

Next, the CPU51 transmits to the main control unit 40 the selection information that is based upon selection of high hands and low hands (step S207). Upon the receipt of the selection information, the main control unit 40 determines a high hand and a low hand of the banker's cards, and then, executes processing of determining a winner or loser (see step S108 of FIG. 11A).

Next, the CPU51 receives winner-loser information from the main control unit 40 (step S208). Subsequently, the dealt-card display section 83 of the liquid crystal display 10 displays any one of the images inclusive of the messages "You Win", "You Lose", and "Draw", during a predetermined period of time, based upon the received winner-loser information.

Next, the CPU51 receives normal-BET payout information from the main control unit 40 (step S209). Upon the receipt of the normal-BET payout information, the CPU51 stores in the RAM52 the credit data that is based upon the normal-BET payout information.

Next, the CPU51 receives normal-BET payout information, based upon the normal-BET payout information received at step S209 (step S210). In this normal-BET payout processing, in a case where a player has won, payout is performed, based upon information indicative of a credit of which amount is twice of that of the normal BET; and in a case where the result is "draw", payout is performed, based upon information indicative of a credit of which amount is equal to that of the normal BET. In addition, in a case where the banker has won, information indicative of the fact that the amount of credit to be given is 0 is displayed.

Next, in FIG. 13B, the CPU51 judges whether or not entry of side BET has been made, while in the BET acceptance at step S202 (step S211). Specifically, the CPU51 judges whether or not a side-BET flag is set. When the CPU51 judges that entry of the side BET has not been made (step S211: NO), the routine proceeds to step S214.

On the other hand, upon judging that entry of the side BET has been made (step S211: YES), the CPU51 receives JP payout information (step S212). Specifically, the CPU51 receives JP payout information from the main control unit 40. Upon the receipt of the JP payout information, the CPU51 stores in the RAM52 the credit data that is based upon the JP payout information.

Next, the CPU51 executes JP payout processing (step S213). Specifically, the CPU51 pays out credit, based upon the JP payout information received at step S212.

Next, the CPU51 receives, from the main control unit 40, the side game dealt-card information indicative of the cards dealt to the players in a side game (step S214). Specifically, the CPU51 receives the dealt-card information transmitted at step S117 of FIG. 11B.

Next, the CPU51 displays side-game cards (step S215). Specifically, the CPU51 displays the card image indicative of the five player's cards at the dealt-card display section 83 of the liquid crystal display 10, based upon the side game dealt-card information received at step S214.

Next, the CPU51 receives side game winner-loser information from the main control unit 40 (step S216). Then, the dealt-card display section 83 of the liquid crystal display 10 displays any one of the images inclusive of the messages "You Win", "You Lose", and "Draw", during a predetermined period of time, based upon the received winner-loser information.

Next, the CPU51 judges whether or not a side-BET flag is set to ON (step S217). Specifically, the CPU51 judges whether or not entry of a side BET is made during BET acceptance of step S202, and the side-BET flag is set. When the CPU51 judges that the side-BET flag is not set to ON (step S217: NO), the CPU51 terminates station processing when the processing of step S217 is executed.

On the other hand, at the time of judging that the side-BET flag is set to ON (step S217: YES), the CPU51 receives side game payout information (step S218). Upon the receipt of the side game payout information, the CPU51 stores in the RAM52 the credit data that is based upon the side game payout information.

Next, the CPU51 executes side game payout processing, based upon the side game payout information received at step S218 (step S219). In this processing operation, in a case where a winning combination of the side-betted players' cards is a predetermined combination, a credit is paid out based upon the side game payout information received at step S218.

Next, a second embodiment of the invention will be described in detail with referring to FIG. 14. Specifically, a correspondence relationship in payment exerted by a winning combination of cards, while in a side game, according to the second embodiment, will be described in detail with referring to the drawings. FIG. 14 is a view showing a data table showing a correspondence relationship between winning combinations of the player's cards and their payout types, while in a side game, according to the second embodiment.

In the winner-loser determination processing at step S216 of FIG. 13B, the CPU41 determines a winner or loser, and then, determines a payment, based upon the data table, as shown in FIG. 14. The names of winning combinations of cards existing in the columns of high hand of FIG. 14 correspond to those of winning combinations which were realized by the cards selected at the player's high hand. Here, the card combinations designate "Royal Flush", "Straight Flush", "Four of a Kind", "Full House", "Flush", "Straight", "Three of a Kind", "Two Pairs", and "One Pair" in sequential order of strength. In the columns of payout types, there are several kinds of payments determined depending upon the scale of each payout. Hereinafter, three different types of payments, i.e., MEGA, MAJOR, and MINI are shown in sequential order from the highest payment. Any of the payout types existing in the right column of payout types are determined depending upon each of the winning combinations existing in the column of high hand, and then, a payment is paid out. For example, where the player's card combination is realized as a "One Pair", the payout type MINI is established; where it is realized as a "Full House", the payout type MINI is established; and where it is realized as a "Straight Flush", the payout type MEGA is established.

Figure 15A:
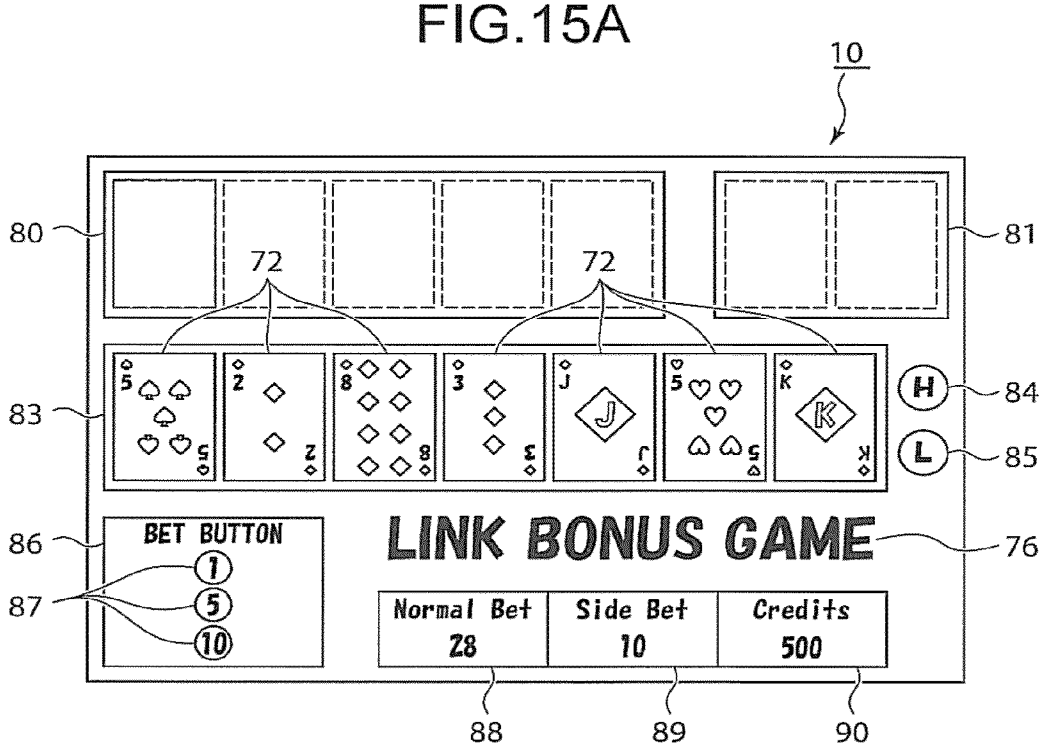
FIG. 15A is a view showing an exemplary image displayed on a liquid crystal display included in each of the stations, while in a side game, according to the second embodiment.
Figure 15B:
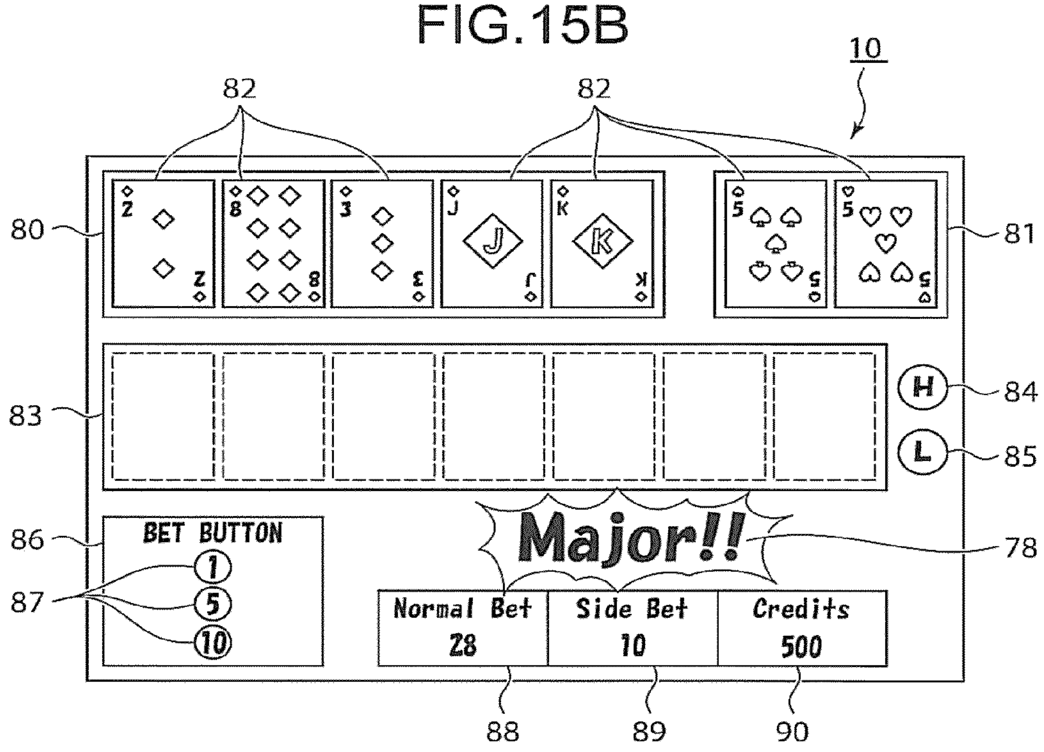
FIG. 15B is a view showing an exemplary image displayed on a liquid crystal display included in each of the stations, while in a side game, according to the second embodiment.

FIGS. 15A and 15B are views each showing an exemplary image displayed on a liquid crystal display of a station, while in a side game, according to the second embodiment. The game machine 1 is made up of a main monitor 2 and 10 stations 3 (3*a* to 3*j*) (see FIG. 3). Hereinafter, a case in which a side BET is performed will be described by way of example.

As shown in FIG. 15A, a high hand display section 80, which displays a high hand, and a low hand display section 81, which displays a low hand, are provided at the liquid crystal display 10 of the station 3. From cards 72 dealt at a station at which a player operates (station 3*a*), the player can determine a high hand by operating a high hand determination button 84 via a touch panel 11, and can determine a low hand by operating a low hand determination button 85 via the touch panel 11. At the lower side thereof, five cards at high hand are displayed at a high hand display section 80, and two cards at low hand are displayed at the lower hand display section 81, respectively. At the lower side thereof, a dealt-card display section 83 is provided which displays an image of the dealt cards. The cards dealt to the player in this example are: "5 of spade"; "2 of diamond"; "8 of diamond"; "3 of diamond"; "Jack of diamond"; "5 of heart"; and "King of diamond".

A side game display 76, which is indicative of the fact that a side game is in progress, is displayed at the lower side of the dealt-card display section 83. At the lower side of the dealt-card display section 83, further, a BET button display section 86 is provided. BET buttons 87 for inputting BET numbers are displayed at the BET button display section 86. The player can input a normal BET number and a side BET number by operating the BET buttons 87 via the touch panel 11. At the lower side of the BET button display section 86, a normal BET number display section 88 is provided which displays the number of normally betted coins. Here, it is shown that 28 coins have been betted.

Where a BET of the 28 coins is input, the player may operate "10" of the BET buttons 87 twice, "5" of the BET buttons 87 once, and "1" of the BET buttons 87 three times. Here, it is shown that, in spite of the player's attempt to perform a side BET, the side BET number display section displays "0", which indicates that no side BET is performed. Further, the credit amount display section 90 is provided at the right side of the side BET number display section 89. Here, it is shown that 500 coins have been credited.

As shown in FIG. 15B, the player determines five cards "2 of diamond", "8 of diamond", "3 of diamond", "Jack of diamond", and "King of diamond" at high hand, and determines two cards "5 of spade" and "5 of heart" at low hand. A winning combination of the player's cards at high hand is realized as a "Flush".

Here, since a side BET is performed, a side game is performed. Further, a winning combination of the player's cards at high hand is realized as a "Flush", the payout type "MAJOR" is established (see FIG. 14). The winner-loser result is displayed as a winner-loser information display 78 ("MAJOR") situated at the lower side of the dealt-card display section 83. A payment, which is based upon the winner-loser information (MAJOR), is paid out to the player.

Next, main control unit processing executed at the main control unit included in the game machine according to the second embodiment, will be described with referring to the drawings. Processing operations other than those specific to the second embodiment that follows, will be described with referring to FIG. 12, since they are substantially identical to those of the first embodiment.

In the second embodiment, at step S122 of FIG. 12B, the CPU41 performs processing of determining a winner or loser in a side game. In this processing operation, the CPU41 executes processing of determining a winner or loser, based upon the cards in a side game, among all of the players having accepted the side BET disclosed at step S120. Namely, a payment is determined based upon a winning combination (poker combination) of the cards included in the player's cards displayed on the front panel display 21. The CPU41 determines a payment, based upon a payment data table according to a predetermined combination stored in the RAM42 (see FIG. 14). Specifically, If any one of the winning combinations "Royal Flush", "Straight Flush", or "Four of a Kind" is realized, the payout type MEGA is established; if any one of the winning combinations "Full House", "Flush", and "Four of a Kind" is realized, the payout type MAJOR is established; and if any one of the winning combinations "Three of a Kind", "Two Pairs", and "One Pair" is realized, the payout type MINI is established. In other words, this CPU performs winner-loser information processing of determining a payment type, based upon the predetermined combination.

In the present embodiment, if a winning combination at high hand is realized as a "Royal Flush", for example, the payout type MEGA is established, and then, the predetermined JP payout (50% of JP, for example) is obtained. If a winning combination of the cards at high hand is realized as a "Flush", for example, the payout type MAJOR is established, and then, the predetermined JP payout (30% of JP, for example) is obtained. If a winning combination of the cards at high hand is realized as a "Three of a Kind", for example, the payout type MINI is established, and then, the predetermined JP payout (10% of JP, for example) is obtained.

In the second embodiment, the following processing operations are performed at step S123 of FIG. 12B. The CPU41 transmits side game winner-loser information. Specifically, at step S122, the CPU41 transmits to the station 3 the winner-loser information which is indicative of a determined side-game winner or loser. At the station 3, upon the receipt of the winner-loser information, the liquid crystal display 10 displays an image which is indicative of any one of the payout types “MEGA”, “MAJOR”, and “MINI”, based upon the received winner-loser information (see FIG. 15B).

In the second embodiment, the CPU41 then transmits side game payout information to the station 3 (step S124). The side game payout information is indicative of the amount of credit (currency value) paid out to the side game. The CPU41 determines a payment (payout information), based upon the side game winner-loser information, and then, transmits the payout information to the station 3. Namely, this CPU pays out the determined payment to the player. Specifically, the CPU41 determines a payout type, based upon any one of the winning combinations “Royal Flush”, “Straight Flush”, “Four of a Kind”, “Full House”, “Flush”, “Straight”, “Three of a Kind”, “Two Pairs”, and “One Pair”, and then, transmits information which is indicative of the payment determined based upon the payout type. For example, in a case where the player’s card combination is realized as a “Flush”, by which a payment is given, a payment corresponding to the payout type MAJOR is given to this player, so that the pertinent information is transmitted to the station. The CPU41 terminates main control unit processing when executing the processing of step S124.

Next, the processing operations executed at each of the stations included in the game machine according to the second embodiment, will be described in detail with referring to the drawings. Processing operations other than those of the second embodiment that follows will be described with referring to FIG. 13, since they are substantially identical to those of the first embodiment.

In the second embodiment, the CPU51 receives side game winner-loser information from the main control unit 40, in the processing operation of step S216 of FIG. 13 (step S216). Subsequently, where a payment is given to the dealt-card display section 83 of the liquid crystal display 10, based upon the received winner-loser information, an image 78 which is indicative of any one of the payout types “MEGA”, “MAJOR”, and “MINI” is displayed for a predetermined period of time (see FIG. 15B).

Next, the CPU51 judges whether or not a side BET flag is ON (step S217). Specifically, the CPU51 judges whether or not a side BET is input while in BET acceptance of step S202, and the side BET flag is set. When judging that the side BET flag is not ON (step S217: NO), the CPU51 terminates side processing.

On the other hand, upon judging that the side BET flag is ON (step S217: YES), the CPU51 receives side game payout information (step S218). Upon the receipt of the side game payout information, the CPU51 stores in the RAM52 the credit data that is based upon the side game payout information.

While the first embodiment described determining a player who pays out the credit determined based upon a poker combination from among the player having accepted a side BET, on condition that the side BET has been accepted, in a side game, this determination may be made on condition that a normal BET has been accepted.

While the first embodiment described judging which one of all player’s cards in combination is strong or weak by comparing them, followed by determining a winner or loser, based upon a judgment result, the judgment may be made in comparison with the banker’s cards, and then, a winner or loser may be determined based upon the judgment result. Further, a payment may be divided among the players who have won against the banker. In this case, the dividing of the payment is controlled based upon the payment table data predetermined so as to increase a payment corresponding to the stronger winning combination of the cards at high hand.

While the first embodiment described a case of performing the PAIGOW poker, the game is not limitative thereto in particular, as long as it is played by dividing the player’s cards and the banker’s cards divided into two groups, followed by employing the cards that were divided into the two groups, in the present invention. In other words, while the first embodiment described a case in which seven cards of each of the persons consisting of the players and banker are divided into two groups, i.e., a group of five cards and a group of two cards, the present invention are not limitative thereto.

While the first embodiment described a case of using trump cards (playing cards), the cards used in the present invention (the player’s cards and the banker’s cards) are not limitative thereto. For example, other cards such as tarot cards, trading cards, Japanese playing cards, Domino cards, and mah-jongg pies may be employed. While the first embodiment described a case in which the dealer takes over the banker, if a plurality of players participate in games, one of the players may take over the banker, in the present invention.

While the first embodiment described a case of performing the PAIGOW poker while the player visually recognizes the liquid crystal display 10 included in each of the stations 3, the game machine in the present invention may be provided with a main monitor 2 or a liquid crystal display (which is included in a station). With this configuration, the dealer’s (banker’s) cards and the player’s cards may be displayed on the main monitor or the display device of such each station.

In the first embodiment, the card game playing method is implemented by the CPU executing it. Further, while the first embodiment described that programs are stored in the ROM43 and the ROM53, they may be stored in the RAM42 and the RAM52. Furthermore, while the first embodiment described that the dealer takes over the banker, one of the players may take over the banker. Moreover, while the first embodiment described that a predetermined number of players is 6, the present invention is not limitative thereto.

While the embodiment according to the present invention has been described, the description presents only some of the specific examples and is not intended to limit the present invention in any way and specific constructions of each means and the like can be properly changed in terms of design. Besides, the effects described in the embodiment of the present invention are only the most preferable effects generated from the present invention and the effects to be caused by the present invention is not limitative thereto.

The more important features of the invention have thus been outlined, rather broadly, in order that the aforementioned detailed description thereof may be better understood, and in order that the present contribution to the art may be better appreciated. There are, of course, additional features of the invention that were described above and which formed the subject matter of the claims appended hereto. In this respect, upon explaining at least one embodiment of the invention in detail, it is to be understood that the invention is not limitative in its application to the details of construction and to the arrangements of the components set forth in the aforementioned description or illustrated in the drawings. According to the invention, other embodiments can be variously practiced and carried out as well. Also, it is to be understood that the phraseology and terminology employed herein are merely intended for the descriptive purpose and should not be regarded as limiting. As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These matters together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matters in which there are illustrated preferred embodiments of the invention.

The detailed descriptions aforementioned may be presented in terms of program procedures executed on a computer or network of computers. These procedural descriptions and representations are the means used by those skilled in the art to most effectively convey the substance of their work to others skilled in the art. A procedure is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities. Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine and/or manual operations. Useful machines for performing the operation of the present invention include general purpose digital computers or similar devices. The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general-purpose machines may be used with programs written in accordance with the teachings herein, or it may prove more convenient to construct more specialized apparatus to perform the required method steps. The required structure for a variety of these machines will appear from the description given.

What is claimed is:

1. A game machine, comprising:

a plurality of display devices, each display device corresponding to one of a plurality of players;

a plurality of input devices, each input device corresponding to one of the display devices and to one of the plurality of players, wherein each of the input devices is able to accept entry for participation of the players;

a memory for storing first card set data inclusive of plural types of card data and second card set data inclusive of card data identical to those included in the first card set data; and a controller for controlling the plurality of display devices, the plurality of input devices, and the memory, the controller being programmed to:

(a) perform a basic game having a maximum number of players using a first card set;

(b) allow each of the plurality of players to play the basic game and to make a first set;

(c) display the player's cards for a first set of the plurality of players playing the basic game and making a first bet on a display device corresponding to each such player, based upon the first card set data, and display a banker's cards on a banker's display device, respectively, while in the basic game the banker's cards being allotted to the game machine;

(d) display player's cards for a second set of the plurality of players playing the basic game and making a first bet, the second set of the plurality of players being in excess of the maximum number of players able to play the basic game using only the first card set, the second set of plurality of players using a second card set with the second card data set on a display device corresponding to each of the second set of players excluding the banker's cards and consisting of card data identical to those of the first card data, the banker's cards being included in the first card set data displayed in (c) so as to utilize the banker's cards in common between the first and second card set data, in a case where participation entry of players is equal to or greater than the maximum number of players using the first card set;

(e) determine a winner or loser, and payout a payment, by comparing the players' cards with the banker's cards, while in the basic game;

(f) perform a side game in a case where a processing condition is met while in the basic game; and (g) compare the player's cards with the banker's cards in the basic game, and pay out a payment of a jackpot to a player having a winning combination with a high payment among plural kinds of winning combinations, while in the side game.

2. The game machine according to claim 1, wherein:

the controller is operable to payout a payment corresponding to a predetermined combination other than that of the jackpot, in a case where the player's cards include the predetermined combination, in the process (g).

3. The game machine according to claim 1 or 2, further comprising:

an input device for accepting a side bet which is different from the first bet; and a memory for accumulatively storing a progressive value corresponding to the side bet accepted by the input device, wherein:

the controller is operable to payout a payment corresponding to the jackpot or the combination, in a case where a side bet is accepted by the input device from the player receiving the payment corresponding to the jackpot or the combination, in the process (g).

4. A game machine, comprising:

a plurality of display devices, each display device corresponding to one of a plurality of players;

a plurality of input devices, each of the plurality of input devices corresponding to one of the plurality of display devices and to one of the plurality of players, wherein each of the plurality of input devices is able to accept entry for participation of the players;

a memory for storing first card set data inclusive of plural types of card data and second card set data inclusive of card data identical to those included in the first card set data; and a controller for controlling each of the plurality of display devices, each of the plurality of input devices, and the memory, the controller being programmed to:

(a) perform a basic game having a maximum number of players using a first card set;

(b) allow each of the plurality of players to play the basic game and to make a first set;

(c) display the player's cards for a first set of the plurality of players playing the basic game and making a first bet on a display device corresponding to each such player, based upon the first card set data, and display a banker's cards on a banker's display device, respectively, while in the basic game the banker's cards being allotted to the game machine;

(d) display player's cards for a second set of the plurality of players playing the basic game and making a first bet, the second set of the plurality of players being in excess of the maximum number of players able to play the basic game using only the first card set, the second set of plurality of players using a second card set with the second card data set on a display device corresponding to each of the second set of players excluding the banker's cards and consisting of card data identical to those of the first card data, the banker's being included in the first card set data displayed in (c) so as to utilize the banker's cards in common between the first and second card set data, in a case where participation entry of players is equal to or greater than the maximum number of players using the first card set;

(e) determine a winner or loser, and payout a payment, by comparing the players' cards with the banker's cards, while in the basic game;

(f) perform a side game in a case where a processing condition is met while in the basic game; and (g) compare the players' cards with the banker's cards in the basic game, payout a payment of jackpot to a player having a winning combination with a high payment among plural kinds of winning combinations, and payout a payment corresponding to a predetermined combination other than that of the jackpot, in a case where the players' cards include the predetermined combination, while in the side game.

5. The game machine according to claim 4, further comprising:

an input device for accepting a side bet which is different from a normal bet; and a memory for accumulatively storing a progressive value corresponding to the side bet accepted by the input device; wherein:

the controller is operable to payout a payment corresponding to the jackpot or the combination, in a case where a side bet is accepted by the input device from the player receiving a payment corresponding to the jackpot or the combination, in the process (f).

6. A game machine, comprising:

a plurality of display devices, each display device corresponding to one of a plurality of players;

a plurality of input devices, each input device corresponding to one of the display devices and to one of the plurality of players, wherein each of the input devices is able to accept entry for participation of the players and a side bet;

a memory for storing first card set data inclusive of plural types of card data and second card set data inclusive of card data identical to those included in the first card set data; and a controller for controlling the plurality of display devices, the plurality of input devices, and the memory, the controller being programmed to:

(a) perform a basic game having a maximum number of players using a first card set;

(b) allow each of the plurality of players to play the basic game and to make a first set;

(c) display the player's cards for a first set of the plurality of players playing the basic game and making a first bet on a display device corresponding to each such player, based upon the first card set data, and display a banker's cards on a banker's display device respectively, while in the basic game the banker's cards being allotted to the game machine;

(d) display player's cards for a second set of the plurality of players playing the basic game and making a first bet, the second set of the plurality of players being in excess of the maximum number of players able to play the basic game using only the first card set, the second set of plurality of players using a second card set with the second card data set on a display device corresponding to each of the second set of players having excluding the banker's cards and consisting of card data identical to those of the first card data, the banker's cards being included in the first card set data displayed in (c) so as to utilize the banker's cards in common between the first and second card set data, in a case where participation entry of players is equal to or greater than the maximum number of players using the first card set;

(e) determine a winner or loser, and payout a payment, by comparing the players' cards with the banker's cards, while in the basic game;

(f) perform a side game in a case where a processing condition is met while in the basic game; and (g) compare the players' cards with the banker's cards in the basic game, payout a payment of a jack not to a player having a winning combination with a high payment among plural kinds of winning combinations and accepting a side bet, and payout a payment corresponding to a predetermined combination other than that of the jackpot to a player accepting a side bet, in a case where the players' cards include the predetermined combination, while in the side game.

7. A system comprising:

a processor; and a memory storing instructions for controlling the processor to perform steps comprising:

(a) inputting a signal indicative of a player having accepted participation entry via at least one device coupled to the processor;

(b) dealing player's cards to a player having accepted participation entry, and dealing banker's cards to a banker, from a first card set consisting of plural kinds of cards, while in a basic game;

(c) determining player's cards to be dealt to at least one player when a number of players having accepted participation entry is in excess of a predetermined number of players, based upon cards excluding the banker's cards of the first card set which are already dealt in (c) so as to utilize the banker's cards in common between the first card data set and a second card set data, the second card set consisting of cards included in the first card set;

(d) dealing the player's cards determined in the step (c) to a player having accepted participation, while in the basic game;

(e) determining a winner or loser, and paying out a payment, by comparing the players' cards with the banker's cards, while in the basic game; and (f) comparing all the players' cards with the banker's cards in the basic game, and paying out a payment of a jackpot to a player having a winning combination with a high payment among plural kinds of winning combinations, while in a side game.

8. The system of claim 7, wherein:

the step (f) includes the step of paying out a payment corresponding to a predetermined combination other than that of the jackpot, in a case where the players' cards include the predetermined combination.

9. The system claim 7 or 8, wherein the memory further stores instructions to perform the step of (g) accepting a side bet which is different from a normal bet, wherein:

the step (g) includes the step of paying out a payment corresponding to that of the jackpot or the combination, in a case where a side bet is accepted from a player receiving the payment corresponding to the jackpot or the combination.

10. A system comprising:

a processor; and a memory storing instructions for controlling the processor to perform steps comprising:

(a) inputting a signal indicative of a player having accepted participation entry via at least one device coupled to the processor;

(b) dealing player's cards to a player having accepted participation entry, and dealing banker's cards to a banker, from a first card set consisting of plural kinds of cards, while in the basic game;

(c) determining player's cards dealt to a player having accepted in excess of the number of players, based upon cards excluding the banker's cards of the first card set which are already dealt in (b) so as to utilize the banker's cards in common between the first and second card set data, among a second card set consisting of cards included in the first card set, in a case where the number of players having accepted the participation exceeds a predetermined number of players;

(d) dealing the player's cards determined in the step (c) to a player having accepted participation, while in the basic game;

(e) determining a winner or loser, and paying out a payment, by comparing the players' cards with the banker's cards, while in the basic game; and (f) comparing all players' cards with banker's cards in the basic game, paying out a payment of a jackpot to a player having a winning combination with a high payment, among plural kinds of winning combinations, and paying out a payment corresponding to a predetermined combination other than that of the jackpot, in a case where the players; cards include the predetermined combination, while in a side game.

11. The system of claim 10, wherein the memory further stores instructions for performing the step of (g) accepting a side bet which is different from a normal bet, wherein:

the step (f) includes the step of paying out a payment corresponding to that of the jackpot or the combination, in a case where a side bet is accepted from a player receiving the payment corresponding to the jackpot or the combination.

12. A game machine which stores a plurality of items of card set data including first card set data inclusive of first card set data on a first card set dealt to a predetermined number of players and a banker, the game machine, comprising:

second card set data which is included in the plurality of items of card set data and is inclusive of a card set identical to that of the first card set data; and a controller being programmed to:

(a) deal, in a case where participation entry of players of which number is equal to or less than a predetermined number of players is accepted, player's cards and banker's cards to players having accepted participation entry and a banker, based upon the first card set data; and (b) deal, in a case where participation entry of players of which number is greater than the predetermined number of players is accepted, the player's cards to a player having accepted participation entry in excess of the predetermined number of players, excluding the banker's cards of the first card set data which are already dealt in (a), from the second card set data consisting of cards identical to those of the first card set data, wherein:

the first card set data and the second card set data are configured to utilize the banker's cards in common.

* * * * *